United States Patent
Hill et al.

(10) Patent No.: US 11,332,908 B2
(45) Date of Patent: May 17, 2022

(54) COUPLER WITH POWER CONNECTION SYSTEM

(71) Applicant: Hiltec Designs Ltd, Newry (GB)

(72) Inventors: Ian Hill, Newry (GB); Terence Haughian, Newry (GB)

(73) Assignee: HILTEC DESIGNS LTD, Newry (GB)

( * ) Notice: Subject to any disclaimer, the term of this patent is extended or adjusted under 35 U.S.C. 154(b) by 0 days.

(21) Appl. No.: 16/736,598

(22) Filed: Jan. 7, 2020

(65) Prior Publication Data

US 2020/0217040 A1    Jul. 9, 2020

(30) Foreign Application Priority Data

Jan. 8, 2019   (GB) ...................................... 1900235

(51) Int. Cl.
*E02F 3/36*   (2006.01)
*F16K 31/42*  (2006.01)

(52) U.S. Cl.
CPC ............ *E02F 3/3663* (2013.01); *E02F 3/365* (2013.01); *F16K 31/42* (2013.01)

(58) Field of Classification Search
CPC ....... E02F 3/365; E02F 3/3654; E02F 3/3663; F16K 31/42
USPC ....................................................... 414/723
See application file for complete search history.

(56) References Cited

U.S. PATENT DOCUMENTS

| | | | | |
|---|---|---|---|---|
| 4,208,163 A | * | 6/1980 | Holmqvist ............ | E02F 3/3631 280/421 |
| 6,619,319 B1 | * | 9/2003 | Horton .................. | E02F 3/3627 137/614 |
| 2002/0157287 A1 | * | 10/2002 | Mieger ................. | E02F 9/2271 37/468 |
| 2008/0193210 A1 | * | 8/2008 | Beales .................. | E02F 3/3663 403/326 |

(Continued)

FOREIGN PATENT DOCUMENTS

| | | |
|---|---|---|
| DE | 20312899 U1 | 12/2004 |
| EP | 1566490 A1 | 8/2005 |

(Continued)

OTHER PUBLICATIONS

EP 2096212 A2 Espacenet Machine Translation, Sep. 2009 (Year: 2009).*

(Continued)

*Primary Examiner* — Saul Rodriguez
*Assistant Examiner* — Brendan P Tighe
(74) *Attorney, Agent, or Firm* — Grumbles Law PLLC

(57) ABSTRACT

A coupler for coupling an attachment to an excavator or other machine comprises a powered actuator for actuating a locking member into and out of said locking state, a first power coupling unit, and a second actuator for moving the power coupling unit into and out of an engaging position in which it is engagable with a corresponding second power coupling unit of the attachment. The coupler is configured to cause the first power coupling unit to move into the engaging position after said latching member adopts the locking state (Continued)

and, when decoupling the attachment from the coupler, to cause said latching member to remain in its locking state until after the first power coupling unit is moved out of its engaging position.

25 Claims, 14 Drawing Sheets

(56) References Cited

U.S. PATENT DOCUMENTS

2009/0051163 A1  2/2009 Frey et al.

FOREIGN PATENT DOCUMENTS

| EP | 1624116 A2 | 2/2006 | |
|---|---|---|---|
| EP | 1624116 A3 | 4/2006 | |
| EP | 2096212 A2 | 2/2007 | |
| EP | 2096212 A3 | 9/2007 | |
| GB | 2492850 A | 1/2013 | |
| KR | 20080069469 A | * 7/2008 | ............ E02F 3/3622 |
| WO | 2013000926 A1 | 1/2013 | |
| WO | 2018074937 A1 | 4/2018 | |

OTHER PUBLICATIONS

WO 2018074937 A1 Espacenet Machine Translation, Apr. 2018 (Year: 2018).*
Extended European Search Report for Application No. 20150065.9; dated May 18, 2020. 7 pp.
Keohane, Simon; United Kingdom Search Report for Application No. GB1900235.1; dated Jun. 14, 2019; 1p.

* cited by examiner

COUPLER WITH POWER CONNECTION SYSTEM

FIELD OF THE INVENTION

This invention relates to couplers for coupling power operated attachments to the arm of an excavator or other machine.

BACKGROUND TO THE INVENTION

Hydraulic couplers for quickly connecting and disconnecting construction attachments from excavating equipment are well known and are sometimes referred to as automatic couplers since they can be operated by an operator from within the cab of an excavator or other machine. International PCT patent application WO2011/035883 discloses an example of such a coupler.

Some attachments are hydraulically operated in which case, as well as mechanically coupling the attachment to the arm of the excavator, the hydraulic system of the attachment must be connected to the hydraulic system of the excavator. Conventionally, it is the mechanical coupling that is performed automatically, while connection of the hydraulic systems is performed manually, requiring the operator to leave the cab of the excavator. Not only is this slow and inconvenient, but it also increases the operator's exposure to danger as he has to leave the safety of the cab.

It would be desirable to provide a coupler with an improved hydraulic connection system.

SUMMARY OF THE INVENTION

A first aspect of the invention provides a coupler for coupling an attachment to an excavator or other machine, the coupler comprising:
- a body having a first and second spaced-apart coupling formations for coupling with a respective corresponding coupling formation of said attachment;
- a locking member movable into and out of a locking state in which it is capable of retaining the respective attachment coupling formation in engagement with said first coupling formation;
- a first powered actuator for actuating said locking member into and out of said locking state;
- a first power coupling unit;
- actuating means for moving said power coupling unit with respect to said body into and out of an engaging position in which it is engageable with a corresponding second power coupling unit of said attachment when said attachment is coupled to said excavator or other machine.

Preferably, the coupler includes activation means configured to cause said actuating means to move said first power coupling unit into said engaging position after said latching member adopts the locking state. The activation means may be responsive to said locking member adopting the locking state to cause said actuating means to move said first power coupling unit into said engaging position. The actuating means may comprise a second powered actuator, and said activation means comprises a component of a circuit for operating said second powered actuator, said component being responsive to said locking member adopting the locking state to cause said second actuator to move said first power coupling unit into said engaging position. The second actuator may comprise a hydraulic actuator and said circuit is a hydraulic circuit, wherein said circuit component comprises a hydraulic sequence valve that is responsive to hydraulic pressure in said hydraulic circuit above a threshold level to cause said second actuator to move said first power coupling unit into said engaging position. The threshold level may correspond to a hydraulic pressure when said locking member is in the locking state.

Optionally, the circuit component comprises a switch that is operable by means for determining that said locking member adopts the locking state to cause said second actuator to move said first power coupling unit into said engaging position. The switch operating means may comprise a sensor for detecting when said locking member is in the locking state.

Optionally, the switch operating means comprises a mechanical device arranged for engagement with said locking member, or a component coupled thereto, when said locking member is in the locking state.

In preferred embodiments, said actuating means comprises a hydraulic actuator connected to a hydraulic operating circuit, and wherein said hydraulic operating circuit includes means, preferably a pressure reducing valve, for reducing hydraulic pressure in said hydraulic operating circuit. The hydraulic operating circuit may comprise a pressure reducing valve connected in series after said sequence valve.

Optionally, the activation means comprises a timer.

In some embodiments, said actuating means comprises a second powered actuator, and said activation means comprises a component of a circuit for operating said second powered actuator, said component being responsive to said timer to cause said second actuator to move said first power coupling unit into said engaging position after said latching member adopts the locking state.

Advantageously, the coupler includes delay means configured to, when decoupling an attachment from the coupler, cause said latching member to remain in its locking state until after the first power coupling unit is moved out of its engaging position. Optionally said delay means comprises at least one spring coupled to said latching means and being biased to urge said latching member into the latching state. Optionally said delay means comprises a component of a circuit for operating said first powered actuator, said component being responsive to said first power coupling unit moving out of said engaging position to cause said first actuator to move said latching member out of said latching state. Said circuit component may comprise a switch that is operable by means for determining that said first power coupling unit is out of said engaging position to cause said first actuator to move said latching member out of said latching state. The switch operating means may comprise a sensor for detecting when said first power coupling unit is out of said engaging position.

Optionally, the switch operating means comprises a mechanical device arranged for engagement with said first power coupling unit, or a component coupled thereto, when said first power coupling unit moves out of said engaging position. Optionally, said delay means comprises a timer. The delay means may comprise a component of a circuit for operating said first powered actuator, said component being responsive to said timer to cause said first actuator to move said latching member out of said latching state.

In alternative embodiments, said activation means comprises a mechanical linkage coupled between said latching member and said first power coupling unit.

In some embodiments, said delay means comprises a mechanical linkage coupled between said latching member and said first power coupling unit.

In typical embodiments said first power actuator is a hydraulic actuator. Said actuating means typically comprises a hydraulic actuator.

In preferred embodiments, said first power coupling unit comprises at least one power coupling, typically at least one hydraulic coupling and/or at least one electrical coupling.

Typical embodiments include control means operable to cause said coupler to couple with said attachment by actuating said latching member into said latching state and moving said first power coupling unit into said engaging position, or to decouple from said attachment by moving said first power coupling unit out of said engaging position and actuating said latching member out of said latching state. The control means may comprise one or more user operable control that is preferably operable from a cab of the excavator or other machine.

From a second aspect the invention provides a coupling system comprising the coupler of the first aspect, and a coupling part for said attachment, said coupling part including said second power coupling unit. The second power coupling unit may comprise at least one power coupling, typically at least one hydraulic coupling and/or at least one electrical coupling. The coupling part typically includes first and second spaced apart coupling formations, typically comprising first and second pins, for coupling with the first and second coupling formations of said coupler.

Optionally, the second coupling unit is mounted on the coupling part by one or more spring-biased connector that allows relative spring-biased movement between the second coupling unit and the coupling part, and wherein, preferably, in a rest state the or each connector holds the second coupling unit spaced apart from the coupling part and allows movement of the second coupling unit towards the coupling part against the spring-bias.

Optionally, said actuating means comprises a hydraulic actuator connected to a hydraulic operating circuit, and wherein said hydraulic operating circuit includes a pilot operated valve connected to the retract side of said hydraulic actuator and configurable to prevent hydraulic fluid flowing from said retract side, a pilot control line coupled between the pilot operated valve and the extend side of said actuator, wherein, in an extend mode of the hydraulic actuator, the pilot control line configures said pilot operated valve to allow fluid to flow from said retract side, the pilot operated valve otherwise being configured to prevent hydraulic fluid flowing from said retract side.

Optionally, said actuating means comprises a hydraulic actuator connected to a hydraulic operating circuit, and wherein said hydraulic operating circuit includes a check valve connected to the extend side of the actuator and being configured to prevent hydraulic fluid flowing out of said extend side.

From a third aspect the invention provides a coupling system comprising the coupler of the first aspect of the invention and a depressurization system, wherein said first power coupling unit comprises at least one hydraulic coupling for connection to at least one hydraulic line of a hydraulic system of said excavator or other machine, and wherein said depressurization system comprises:

a depressurization valve device for selectively connecting said at least one hydraulic line to a hydraulic fluid reservoir in order to dump hydraulic fluid from said at least one hydraulic line to said reservoir; and a control device for operating said depressurization valve device, said control device being configured to detect operation of said coupler out of said locking state or into said locking state, wherein said control device is configured to, in response to detecting operation of the coupler out of the locking state, operate said depressurization valve device to connect said at least one hydraulic line to said hydraulic fluid reservoir in order to dump hydraulic fluid from said at least one hydraulic line to said reservoir, and in response to detecting operation of the coupler into said locking state, to operate said depressurization valve device to prevent hydraulic fluid being dumped from said at least one hydraulic line to said reservoir.

In preferred embodiments, said control device is configured to receive a first input indicating operation of said coupler out of said locking state, and to operate said depressurization valve device to connect said at least one hydraulic line to said hydraulic fluid reservoir in response to said first input. Conveniently, said first input is received from said coupler, preferable from a control valve for controlling operation of said coupler into and out of said locking state.

Optionally, said control device is configured to receive a second input that is indicative of operation of said coupler into said locking state, and to operate said depressurization valve device to disconnect said at least one hydraulic line from said hydraulic fluid reservoir in response to said second input.

Preferably, the coupling system further includes a pressure sensitive device incorporated into a hydraulic circuit of said coupler and being configured to indicate when the hydraulic pressure in said hydraulic circuit is indicative of the coupler adopting said locked state, and wherein said second input is provided by said pressure sensitive device.

Optionally, said control device comprises a latch device that is responsive to said first input to operate said depressurization valve device to connect said at least one hydraulic line to said hydraulic fluid reservoir, and is responsive to said second input to operate said depressurization valve device to disconnect said at least one hydraulic line to said hydraulic fluid reservoir.

Couplers embodying the invention are typically of a type known as quick couplers, more particularly automatic couplers. The invention relates particularly to couplers that are powered, especially hydraulically powered, and advantageously to couplers that are capable of accommodating attachments with different pin spacings.

Other advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
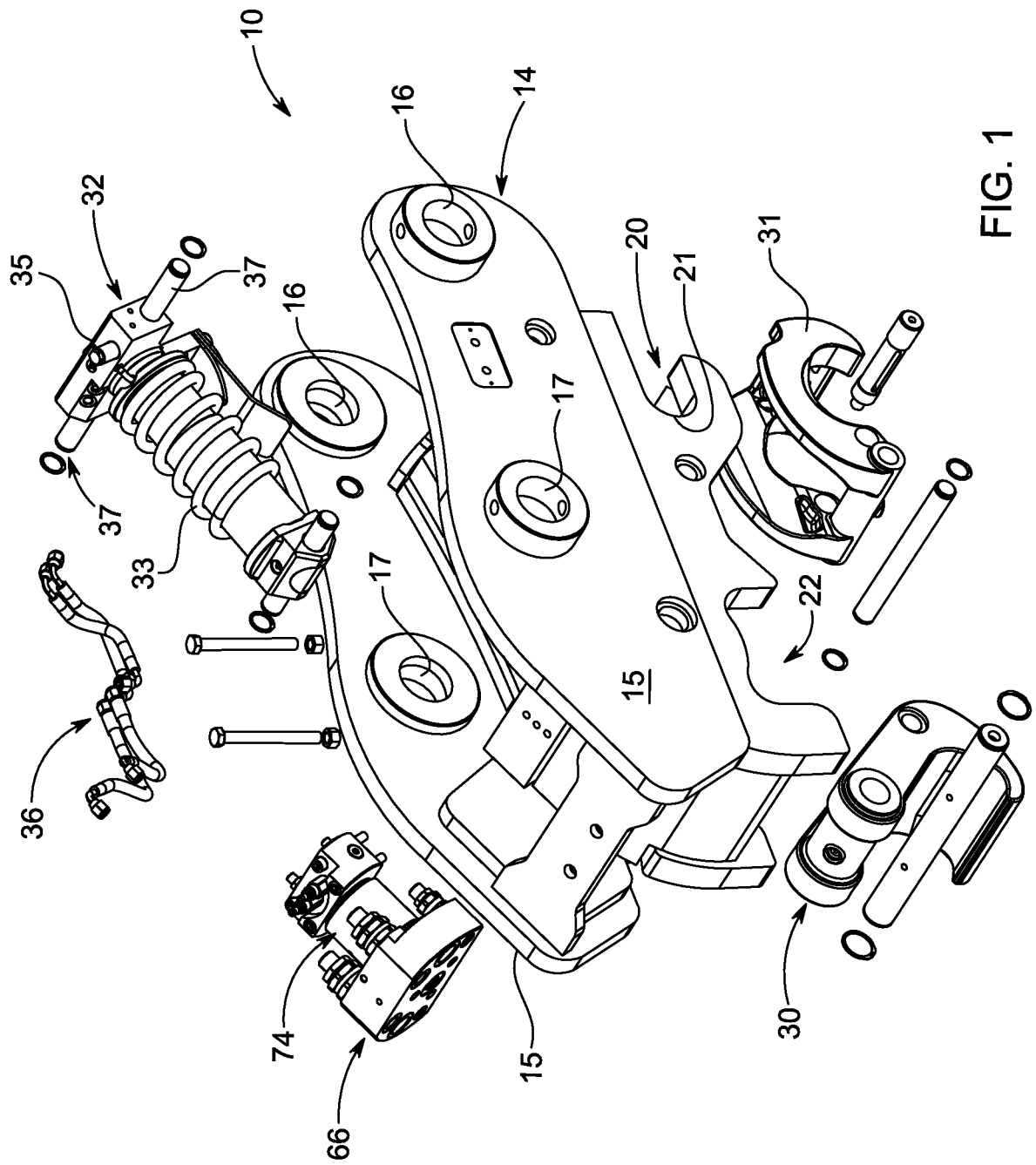
FIG. 1 is an exploded perspective view of a coupler embodying the invention.
Figure 2:
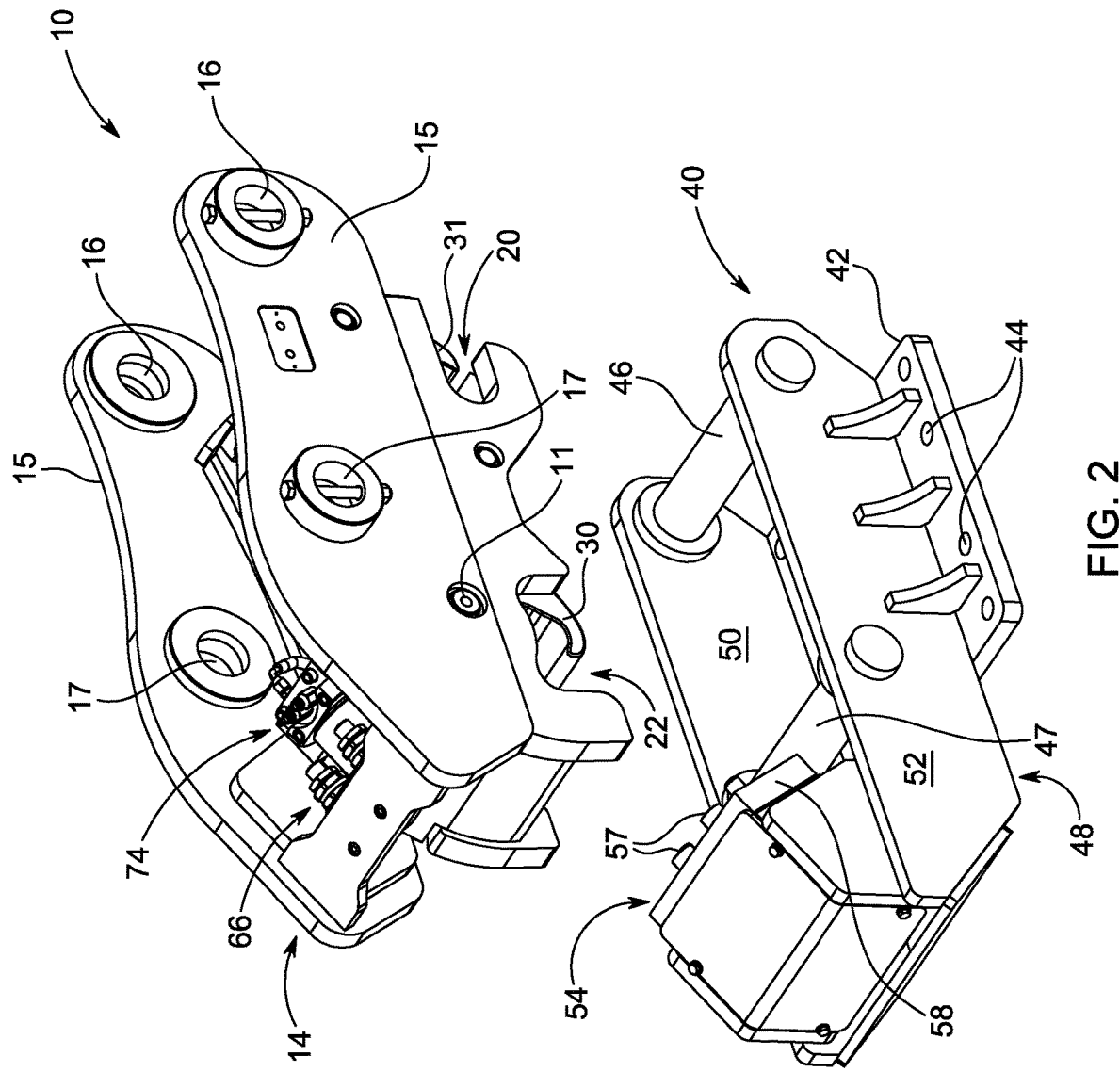
FIG. 2 is a perspective view of the coupler of FIG. 1 and a coupling part of a hydraulic attachment shown in a non-coupled state.
Figure 3:
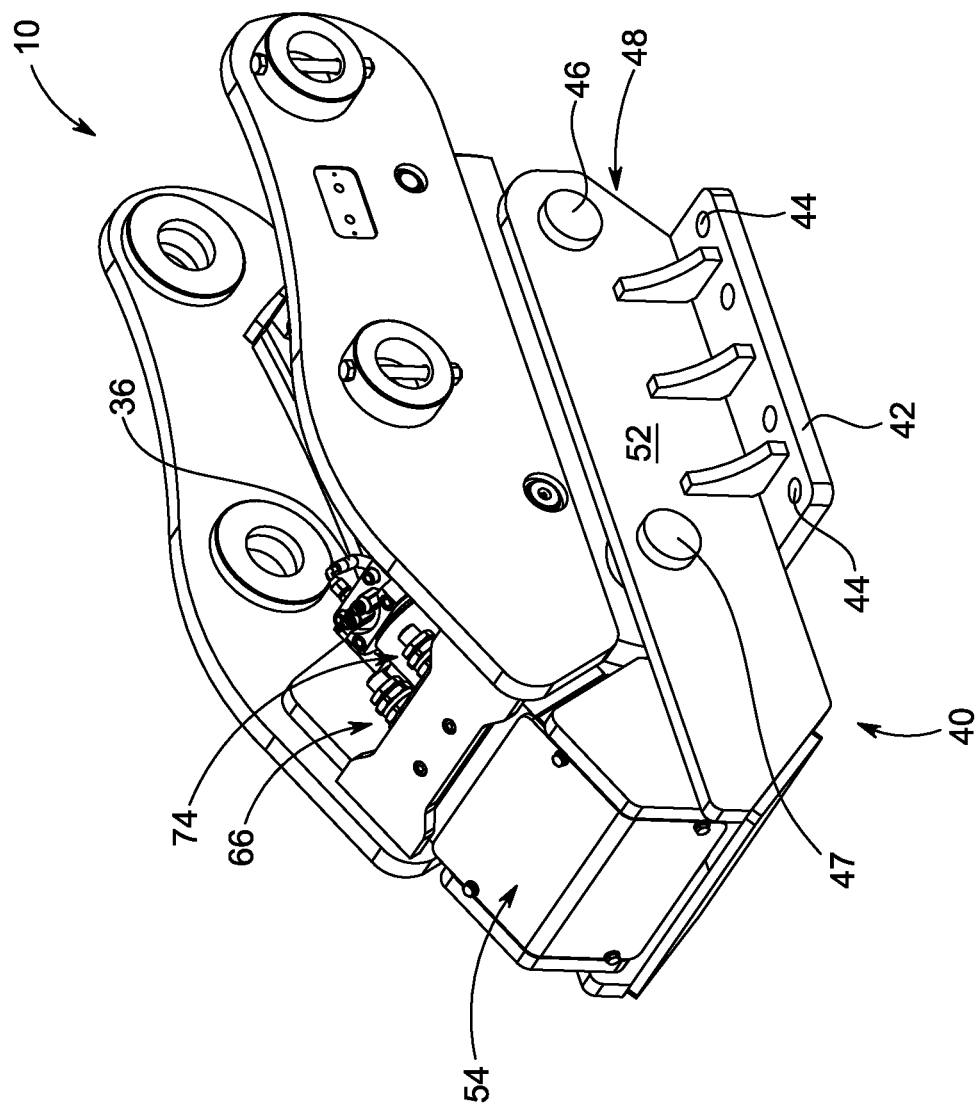
FIG. 3 is a perspective view of the coupler and coupling part of FIG. 2 shown in a coupled state.
Figure 4:
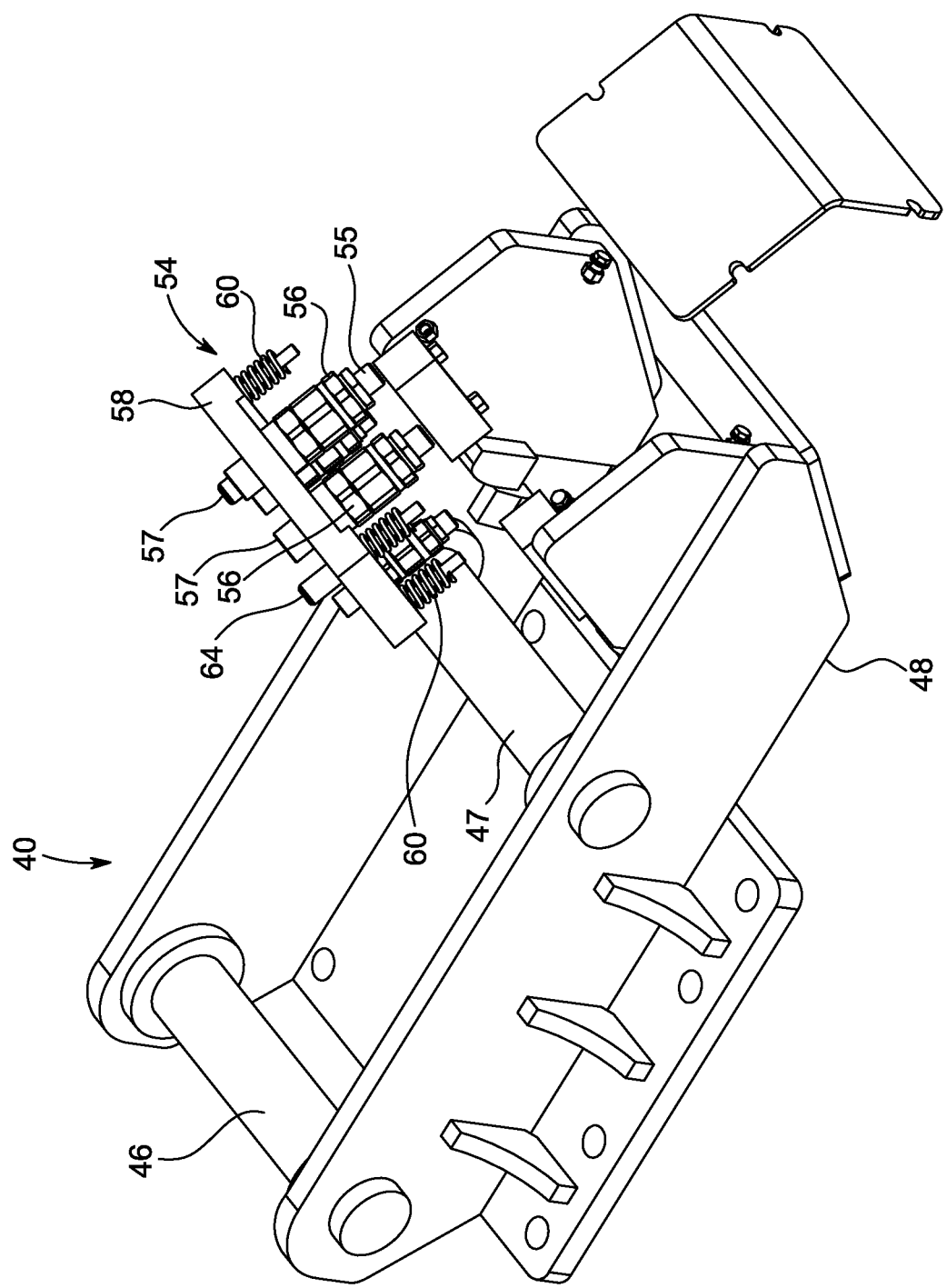
FIG. 4 is an exploded perspective view of the coupling part shown in FIGS. 2 and 3.

Referring now in particular to FIGS. 1 to 3 of the drawings there is shown, generally indicated as 10, a respective coupler (also known as a hitch) for connecting an attachment to an arm, or boom, of an excavator (not shown), or other machine.

Couplers embodying the invention are particularly intended for use with attachments having spaced apart pins with which the coupler releasably engages in order to mechanically couple the attachment to the excavator arm. In the drawings, the attachment is represented by an exemplary coupling part 40, which may be connected to or integrally formed with the attachment in any convenient manner. In the illustrated example it is assumed that the coupling part 40 is bolted onto the attachment and to this end includes one or more plates 42 with bolt-receiving apertures 44. The coupling part 40 includes first and second spaced apart coupling formations, typically in the form of pins 46, 47. The pins 46, 47 extend across the body 48 of the coupling part 40. The body 48 typically comprises first and second spaced apart plates 50, 52, with the pins 46, 47 extending transversely between the plates 50, 52 and being fixed to the plates 50, 52 in any convenient manner. Advantageously, the coupler 10 is able to engage with attachments that have different spacings between the pins, as is described in more detail hereinafter.

The coupler 10 has a body 14 typically comprising two spaced-apart body parts typically in the form of side plates 15. The body 14 is shaped to define pin-receiving apertures 16 and 17 by which the coupler may be connected to the end of the arm. Typically, there are two spaced-apart apertures 16, 17 in each of the two side plates 15, the apertures in one side plate being aligned with the apertures in the other. When connected, the coupler 10 is able to pivot with respect to the arm about the axis of the one of the apertures 16. Usually a hydraulic mechanism, or other power operated mechanism (not shown), is provided, typically in association with a mechanical linkage, to pivot the coupler 10 with respect to the arm. The mechanical linkage is usually connected between the arm and the other aperture 17. In alternative embodiments, other means for coupling to the arm of an excavator or other machine may be provided.

The body 14 includes first and second spaced apart coupling formations in the form of first and second pin-receiving recesses 20, 22, typically formed in each side plate 15. Each recess 20, 22 is shaped and dimensioned to receive a respective pin 46, 47 of the attachment. Normally, the recesses 20, 22 face in mutually perpendicular directions. The recess 20 is typically hook-like in shape and function. The recess 22 is advantageously wider than is necessary to receive a single pin 47 in order to accommodate attachments with different pin spacings, i.e. assuming that one pin 46 is located in recess 20, recess 22 is wide enough to receive the other pin 47 for a range of spacings between the pins 46, 47. The coupler 10 can therefore accommodate attachments having a range of pin spacings. Such couplers are commonly referred to as universal couplers.

The coupler 10 also includes a power-operated locking mechanism typically comprising a locking member, in the preferred form of a hook 30, coupled to an actuator 32 typically in the form of a linear actuator such as a hydraulic ram. Other forms of powered actuator could be used (e.g. pneumatic or electrically operated) but hydraulic is convenient because excavators typically have a hydraulic system available at or near the end of the arm. The locking hook 30 and ram 32 are provided between the side plates 15. The locking hook 30, which may comprise one or more aligned hook elements, may be pivotably mounted on the body 14 at pivot 11 in any convenient manner and is pivotable about an axis that runs substantially perpendicular to the body 14/plates 15. The hook 30 is pivotable (or otherwise movable—see below) between an open, or non-locking, state and a locking state by the actuator 32. In the open state, the locking hook 30 allows the pin 47 to be inserted into or removed from the recess 22. In the locking state, the locking hook 30 prevents the pin 47 from being removed from the recess 22. The actual position of the locking member 30 in the locking state will depend on the pin spacing of the attachment being engaged. In preferred embodiments, at least one spring 33, e.g. a compression spring, may be provided for urging the locking member 30 into its locking state. Conveniently the spring(s) 33 are located around the piston chamber of the actuator 32 and biased to urge the actuator 32 into an extended state.

In typical embodiments, the actuator 32 includes a block 35 (sometimes referred to as a cylinder block) located at the butt end of the piston chamber, i.e. the end opposite the piston rod end. The block 35 typically includes one or more hydraulic circuit components, e.g. fluid channel(s) and/or valve(s) (typically including a pilot operated check valve). Conveniently, the actuator 32 is coupled to the body 14 of the coupler 10 at the block 35, e.g. by pins 37 or other coupling, which allow pivoting movement of the actuator 32 with respect to the body 14 in preferred embodiments.

Conventionally, the recess 22 is said to be at the rear of the coupler and the locking member 30 may therefore be referred to as a rear locking member. Optionally, a front locking member 31 may be provided for releasably holding the pin 46 in the front recess 20. The front locking member 31, when present, may be operated into and out of a locking state (in which it holds the pin 46 in the recess 20) by any convenient means. For example it may be pushed by pivoting movement of the actuator 32, may be operated by its own actuator (not shown).

Under normal operating conditions when the locking hook 30 is in its locking state, the pin 46 located in recess 20 is urged against the rear surface 21 of the recess 20 by the action of the locking hook 30 on the other pin 47 located in the other recess 22 under the force exerted by the actuator 32.

In alternative embodiments (not illustrated) the locking member 30 is movable substantially linearly between the open and locking states by the actuator 32, and to facilitate this may be slidably mounted on the body 14, for example by means of a linear slide mechanism coupling the locking member to the body 14.

The various components of the coupler 10, which are shown in exploded view in FIG. 1, may be assembled using any convenient fixings and couplings as are, for example, shown in FIG. 1.

Couplers embodying the invention are particularly, but not exclusively, suited for use with power-operated attachments, especially hydraulically operated attachments. Examples of power-operated, especially hydraulically operated, attachments include buckets, shears, grapples, drills, breakers, pulverisers, cutters, drive units and other tools. Some attachments may comprise one or more electrically operated parts as well as, or instead of, any hydraulically operated parts. Alternatively, or in addition, some attachments may be pneumatically operated.

The coupling part 40 includes a power coupling unit 54 that includes at least one, but typically a plurality of power couplings or power connectors 56. In the illustrated embodiment, the coupling unit 54 is a hydraulic coupling unit 54 that includes at least one, but typically a plurality of, hydraulic couplings 56. In alternative embodiments, the coupling unit 54 may include one or more other types of power connector (e.g. electrical connector(s) and/or pneumatic coupling(s)) as well as or instead of hydraulic coupling(s), depending on the type of attachments with which the coupler is intended to be used.

The hydraulic couplings 56 may comprise any suitable coupling for use in connection of fluid lines, e.g. British Standard Plumbing (BSP) couplings. In use, one end 55 of each coupling 56 is connected to a fluid line (not shown but typically in the form of a pipe, hose or tube) of the hydraulic system of the attachment, while the other end 57 is exposed for connection to a corresponding coupling provided on the coupler 10, as is described in more detail hereinafter.

The couplings 56 are carried by a body 58 of the coupling unit 54, the body 58 conveniently comprising a plate. In preferred embodiments, the body 58 comprises a respective though-aperture 59 for receiving each coupling 56 such that the end 55 of the coupling 56 is on the reverse side of the body 58, while the other end 57 is on or otherwise exposed by the obverse side 59.

The coupling unit 54 may be mounted on the coupling part 40 in any convenient manner. In preferred embodiments, the body 58 of the coupling unit 54 is mounted on the body 48 of the coupling part by one or more spring-biased connector 60 that allows relative spring-biased movement between the coupling unit 54 and the coupling part 40. In a rest state, the connectors 60 hold the coupling unit 54 spaced apart from the body 48 and allow movement of the coupling unit towards the body 48 against the spring-bias. In the illustrated embodiment, the each connector 60 comprises a fixing pin 61 connecting the body 58 of the coupling unit 54 to the body 48 of the coupling part 40, and respective compression spring 62 located around the pin 61 between the bodies 48, 58. Optionally, one or more guides, for example in the form of pins 64 or other suitable formation, are provided at the obverse side of the body 58.

In preferred embodiments, the coupling unit 54 is located at the rear of the coupling part 40 with its obverse side facing forwardly. Preferably, the obverse side of the coupling unit 54 faces upwardly and obliquely with respect to a plane in which the pins 56, 57 lie.

In the illustrated embodiment there are four hydraulic couplings 56 although in alternative embodiments there may be more or fewer. The number and arrangement of the couplings 56 (hydraulic or otherwise) may vary to suit the application. The illustrated embodiment has four connectors 60, one at each corner of the body 58. Alternatively, there may be more or fewer connectors 60 and they may be arranged as suits the application. The illustrated embodiment has two guides 64. Alternatively, there may be more or fewer guides 64 and they may be arranged as suits the application.

The coupler 10 has a power coupling unit 66 for releasably coupling with the power coupling unit 54 of the coupling part 40. To this end, the coupling unit 66 includes at least one, but typically a plurality of power couplings or power connectors 68 corresponding to the couplings/connectors 56 of the coupling unit 54. In the illustrated embodiment, the coupling unit 66 includes at least one, but typically a plurality of, hydraulic couplings 68. The couplings 68 may comprise any suitable coupling for use in connection of fluid lines, e.g. British Standard Plumbing (BSP) couplings. In use, one end 65 of each coupling 68 is connected to a fluid line (not shown but typically in the form of a pipe, hose or tube) of the hydraulic system of the excavator (or other machine to which the coupler 10 is attached), while the other end 67 is exposed for connection to the end 57 of a corresponding hydraulic coupling 56 provided on the hydraulic coupling unit 54 of the coupling part 40.

The couplings 68 are carried by a body 70 of the coupling unit 66. The body 70 may take any convenient form, preferably including an obverse face 71. In preferred embodiments, the body 70 comprises a respective though-aperture 72 for receiving each coupling 68 such that the end 65 of the coupling 68 is on the reverse side of the body 70, while the other end 67 is exposed at the obverse face 71. Optionally, one or more guides, for example in the form of sockets 75 or other suitable formation, are provided at the obverse face 71 of the body 70. The guides 75 of the unit 66 are cooperable with the guides of the unit 54 to facilitate engagement of the respective units 54, 66.

In preferred embodiments, the coupling unit 66 is coupled to an actuator 74, typically in the form of a linear actuator such as a hydraulic ram. Other forms of powered actuator (e.g. a pneumatic or electrically operated actuator) or other actuating means may alternatively be used. The actuator 74 is operable to move the coupling unit 66 with respect to the coupler body 14. The movement of the coupling unit 66 allows it to be moved into and out of an engaging position in which it engages with the hydraulic coupling unit 56 when the attachment is connected to the coupler 10. Conveniently, the coupling unit 66 is connected to the free end of the piston rod (not visible) of the actuator 74 and is movable linearly with respect to the body 14. The unit 66 may be connected to the piston rod by any convenient means, e.g. a bolt 77.

The actuator 74 may be mounted on the coupler body 14 in any convenient manner, typically between the plates 15 using any suitable fixings and/or supports. In preferred embodiments, the actuator 74 is located at the rear of the coupler 10 with its obverse face 71 facing forwards. Preferably, the obverse face 71 faces downwardly and obliquely with respect to a plane in which the apertures 20, 22 lie. The location and orientation of the actuator 74 is such that the coupling unit 66 may be moved into and out of engagement with the coupling unit 56 of the coupling part 40.

In the illustrated embodiment there are four hydraulic couplings 68 (a respective one for connection to each of the couplings 56) although in alternative embodiments there may be more or fewer. The number and arrangement of the couplings 68 may vary to suit the application. More generally, the hydraulic coupling unit 66 has a respective hydraulic coupling 68 for connecting with a respective hydraulic coupling 56 of the hydraulic coupling unit 54.

In alternative embodiments (not illustrated) the coupling part 40 may include one or more electrical couplings (which may take any standard form). Any such electrical couplings may be provided on or in the coupling unit 54 (e.g. in the case where the attachment is both hydraulically and electrically powered), or may be provided on or in an electrical coupling unit (e.g. in cases where the attachment is only electrically powered), which may be similar to the coupling unit 54. The coupler 10 may include one or more corresponding electrical couplings (which may take any standard form). Any such electrical couplings may be provided on or in the coupling unit 66 (e.g. in the case where the attachment is both hydraulically and electrically powered), or may be provided on or in an electrical coupling unit (e.g. in cases where the attachment is only electrically powered), which may be similar to the coupling unit 66. The arrangement is such that the respective electrical couplings/connectors on the coupler 10 and coupling part 40 can be brought into and out of connection with each other in the same or similar manner to that described herein with respect to the hydraulic couplings.

In typical embodiments, the actuator 74 includes a block 76 (sometimes referred to as a cylinder block) located at the butt end of the piston chamber 78, i.e. the end opposite the piston rod end. The block 76 typically includes one or more hydraulic circuit components, e.g. fluid channel(s) and/or valve(s) (typically including a pilot operated check valve). Conveniently, the actuator 74 is coupled to the body 14 of the coupler 10 at the block 76, e.g. by pins 79 or other fixings.

In preferred embodiments, the actuator 74 is provided with one or more hydraulic couplings 80 by which it may be connected to one or more hydraulic circuits for operating the actuator 74. Conveniently, the hydraulic couplings 80 are provided at the block 76. The couplings 80 may comprise any suitable coupling for use in connection of fluid lines, e.g. British Standard Plumbing (BSP) couplings.

In use, when the pins 46, 47 are located in the respective recess 20, 22, the hook 30, and if present the hook 31, are in their respective closed state to retain the pins 46, 47 in he recesses 20, 22. The hydraulic coupling unit 66 of the coupler 10 is in its engaging position in which it engages with the hydraulic coupling unit 54 of the coupling part 40. In the engaged state of the units 54, 66, the obverse face 71 of the coupling unit 66 is brought together with the obverse side of the coupling unit 54 so that the respective hydraulic couplings 68, 56 engage with each other to create a hydraulic connection between the hydraulic system of the excavator and the hydraulic system of the attachment. Hence, the attachment is able to receive hydraulic power. The spring-biased connectors 60 facilitate establishing a fluid-tight connection between the respective hydraulic couplings 68, 56.

The actuator 32 for the latching hook 30 is connected to the hydraulic system of the excavator in conventional manner (typically via its cylinder block 35). The actuator 74 is also connected to the hydraulic system of the excavator, via its cylinder block 76 in the illustrated embodiment, and in particular via hydraulic couplings 80. Conveniently, the cylinder block 35 is hydraulically connected to the cylinder block 76 by hydraulic lines 36 to allow hydraulic power to be supplied to the actuator 74.

Figure 10:
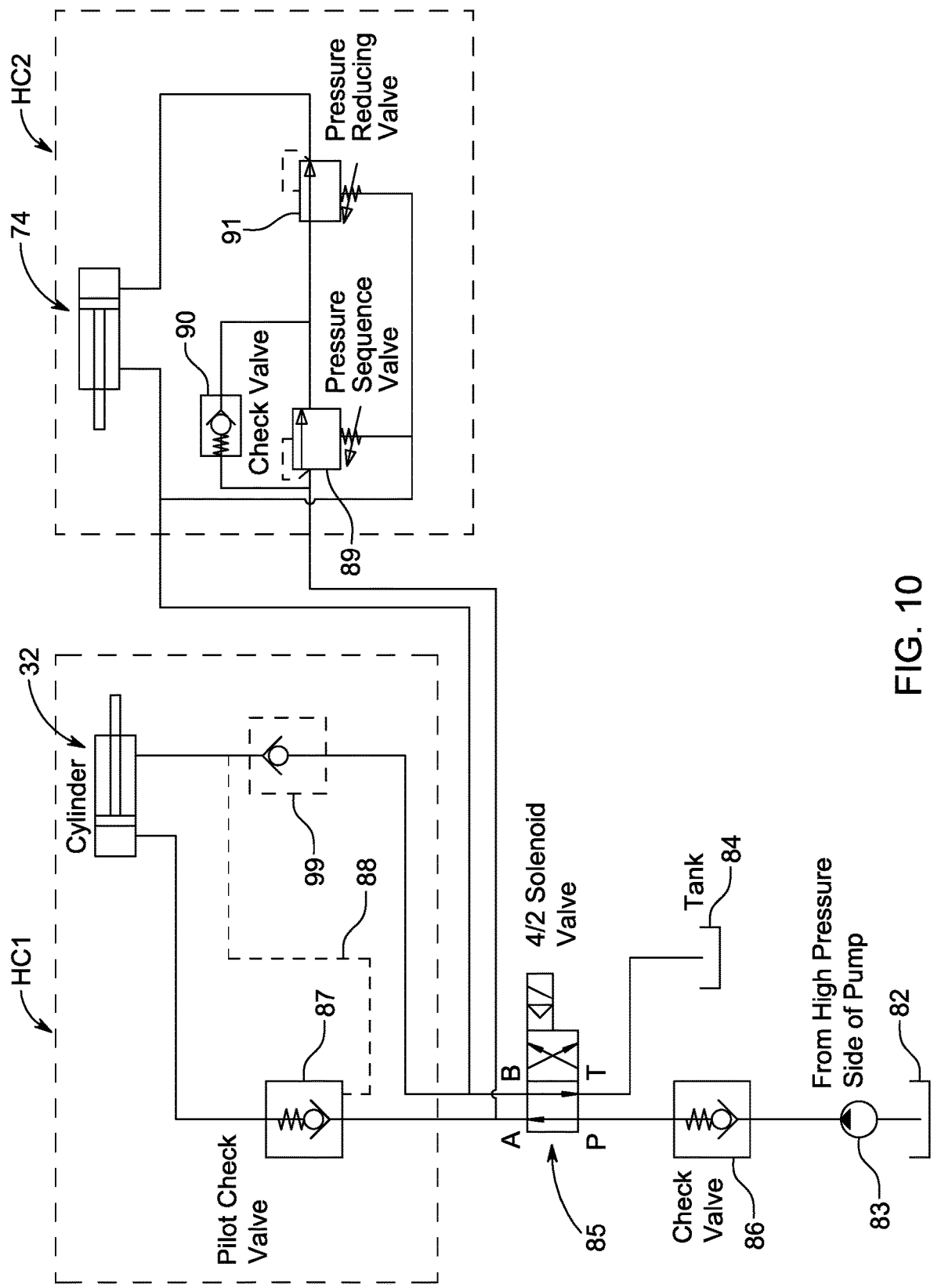
FIG. 10 is a schematic diagram of a hydraulic circuit for use with the coupler of FIG. 1.

The coupler 10 includes a controller for controlling the operation of the actuators 32, 74. FIG. 10 shows a controller comprising hydraulic circuitry that is suitable for hydraulically connecting the actuators 32, 74 to the hydraulic system of the excavator, or other machine. The hydraulic system includes a source 82 of hydraulic fluid (typically oil) and a pump 83 for supplying the hydraulic fluid, under pressure, to the rest of the hydraulic circuitry. The hydraulic system includes a hydraulic fluid reservoir, shown in the drawings as tank 84, to which hydraulic fluid is returned. Typically, the source 83 and tank 84 are provided by the same fluid reservoir. In preferred embodiments, each actuator 32, 74 is a double-acting hydraulic ram and incorporated into a respective hydraulic circuit HC1, HC2 for extending and retracting the ram. A hydraulic directional control valve 85 is connected between the circuits HC1, HC2 and the source 82 and tank 84 for controlling the flow of hydraulic fluid to and from the circuits HC1, HC2. In particular, each circuit HC1, HC2 is connected to first and second ports A, B of the valve 85. The pump 83 is connected to port P and the tank 84 is connected to port T. The valve 85 is operable to affect an extending mode in which hydraulic fluid flows to the circuits via port A and returns to port B, or a retracting mode in which hydraulic fluid flows to the circuits HC1, HC2 via port B and returns via port A. The valve 85 may conveniently be a four port/two position directional control valve, wherein in the two positions the connections between the ports P, T and the ports A, B are reversed. The valve 85 is preferably electrically controlled, conveniently being a solenoid valve (and may therefore be operable remotely by a user in the cab of the excavator), but may alternatively be controlled by any other means (preferably by remote control means such that it may be operated remotely by a user in the cab of the excavator).

Typically, a check valve 86 is connected between the valve 85 and the pump 83 to prevent fluid flowing from the valve 85 to the pump 83.

In the extending mode, hydraulic fluid flows from port A to the extend side of the ram 32 and causes its piston rod to extend. Fluid returns to port B from the retract side of the ram 32. In the retracting mode, hydraulic fluid flows from port B to the retract side of the ram 32 and causes its piston rod to retract. Fluid returns to port A from the extend side of the ram 32. Optionally a pilot operated check valve 87 is connected between port A and the extend side of the ram 32 for preventing hydraulic fluid from flowing from the extend side to port A in the extending mode. The pilot control line 88 of the valve 87 may be connected to the retract side so that, in the retracting mode, the check valve 87 allows fluid to flow from the extend side to port A.

In the extending mode, hydraulic fluid flows from port A to the extend side of the ram 74 and causes its piston rod to extend. Fluid returns to port B from the retract side of the ram 74. In the retracting mode, hydraulic fluid flows from port B to the retract side of the ram 74 and causes its piston rod to retract. Fluid returns to port A from the extend side of the ram 74.

Advantageously, circuit HC2 includes a pressure sequence valve 89 in the extend side of the circuit, in particular connected between port A and the extend side of the ram 74. The pressure sequence valve 89 is configured so that, in the extending mode, it does not allow hydraulic fluid to flow to the extend side of the ram 74 until the hydraulic fluid pressure supplied to the valve 89 exceeds a pressure threshold value. The pressure threshold value may vary depending on the application but in the present example may be approximately 100 bar. In preferred embodiments, the valve 89 is a normally-closed valve. To facilitate the retracting mode, a check valve 90 may be connected across the sequence valve 89 to allow hydraulic fluid to flow from the extend side to port B bypassing the sequence valve 89.

In preferred embodiments, circuit HC2 includes a pressure reducing valve 91 in the extend side of the circuit, in particular connected between the sequence valve 89 and the extend side of the ram 74. The pressure reducing valve 91 is configured so that, in the extending mode, it reduces or limits the hydraulic fluid pressure flowing to the extend side of the ram 74 to a preset level. The preset level may vary depending on the application but in the present example may be approximately 100 bar. In preferred embodiments, the valve is a normally-open valve and as such no bypass check valve is required to facilitate the retract mode.

The circuit components of hydraulic circuits HC1, HC2 may be provided in or on the respective cylinder blocks 35, 76, or elsewhere as is convenient. In the illustrated embodiment, hydraulic lines 36 provide the connections between the ports A, B and the circuit HC2.

The preferred operation of the coupler 10 is now described. In order to engage with an attachment, in its open state the coupler 10 is manoeuvred such that the pins 46, 47 are located in the respective recess 20, 22. The control valve 85 is operated (conveniently from the cab of the excavator by any conventional remote control means, e.g. comprising one or more user control for causing the coupler to engage or disengage with the attachment) to effect the extending mode in which hydraulic fluid is supplied to the circuits HC1, HC2 via port A. As a result, ram 32 extends and causes the hook 30 to engage with the pin 47. During this extension of ram 32, the fluid pressure supplied to the pressure sequence valve 89 does not exceed its threshold value and so it does not supply pressurised hydraulic fluid to the extend side of the ram 74. As a result, the ram 74 does not extend and so the hydraulic coupling unit 66 is not moved into engagement with the hydraulic coupling unit 54. After the hook 30 has engaged with the pin 47, hydraulic pressure in circuit HC1, and in particular in its extend side, increases to a level that exceeds the threshold value of the sequence valve 89. Since the circuits HC1, HC2 are interconnected, and in particular since the respective extend side (i.e. the part of the circuit that supplies hydraulic fluid to the extend side of the ram) of each circuit HC1, HC2 are both connected to port A, the fluid pressure supplied to the sequence valve 89 is correspondingly increased. As a result, the sequence valve 89 allows hydraulic fluid to flow into the extend side of ram 74, causing ram 74 to extend and moving the coupling unit 66 into the engaged state with the coupling unit 54. Hence, the coupling unit 66 does not move into engagement with the coupling unit 54 until after the hook 30 has engaged with the pin 47. It is advantageous for the coupling unit 66 to be moved into engagement with the coupling unit 54 after the hook 30 has engaged with the pin 47 since this allows correct alignment between the units 54, 66 to be achieved before engagement is effected, which reduces the possibility of the components of the units 54, 66 being damaged during engagement.

It will be apparent from the foregoing that the sequence valve 89 serves as activation means that is (indirectly) responsive to engagement of the latch 30 with the pin 47 to cause the coupling unit 66 to move into engagement with the coupling unit 54. In alternative embodiments, the coupler may include alternative activation means for controlling its operation such that, when coupling an attachment to the coupler, the hook 30 reaches its locking state before the hydraulic coupling unit 66 is moved into engagement with the hydraulic coupling unit 54. For example, the sequence valve 89 may be replaced by a hydraulic switch (not illustrated) that is operable to allow or prevent hydraulic fluid flowing to the extend side of the ram 74 to effect extension of the ram 74. The arrangement may be such that the switch is closed (to prevent hydraulic fluid flowing to the extend side of the ram 74) when the hook 30 is in its non-locking state, and open (to allow hydraulic fluid to flow to the extend side of the ram 74) when the hook 30 is in its locked state. In alternative embodiments in which movement of the coupling unit 66 is controlled by an electrical circuit, the switch may be an electrical switch. The switch may be of any conventional type, for example it may be a solenoid or relay-operated switch.

In any event, the switch may be operated by any convenient means. For example, the switch may be operated by a sensor (not shown), or other detecting means, that is arranged to detect whether or not the hook 30 is in its locking state, and is connected to the switch to operate it accordingly. By way of example, the sensor may be arranged (e.g. suitably located on the coupler) to directly or indirectly detect the location of the hook 30, or the extension of the ram 32, or the pressure in circuit HC1, so that it activates the switch when the hook 30 in in the locking state. The sensor may take any conventional form, e.g. a non-contact sensor such as an optical sensor, an electrical field sensor or an acoustic (e.g. ultrasonic sensor), or a contact sensor, e.g. a pressure sensor or a mechanical device that is positioned to be activated (e.g. by pressure or movement) by engagement with the hook itself, or with any other component that moves with the hook, when the hook moves into its locking state (i.e. the switch may be a mechanically operated switch, such as a plunger switch, lever switch or a limit switch). Alternatively still, the activation means may comprise a mechanical linkage (not shown) coupled between the coupling unit 66 and the hook 32 and configured to cause the coupling unit 66 to move into engagement with the coupling unit 54 after the hook 32 has reached its locking state. Alternatively still, the switch may be operated by a timer (e.g. such that the ram 74 is extended a period of time after control valve 85 is activated to extend the hook 30 to allow time for the hook 30 to reach its locking state).

Referring again to FIG. 10, when the hook 30 is in its locking state, the hydraulic fluid pressure in the circuits HC1, HC2 (and in particular in their respective extend side) is typically relatively high, for example approximately 350 bar, in order that the locking state is securely maintained. Such elevated pressure levels are higher than required to maintain the hydraulic coupling units 54, 66 in the engaged state and may cause damage to any one or more of the ram 74, its mountings and/or the coupling units 66. Therefore, it is preferred to provide the pressure reducing valve 91 to reduce the hydraulic fluid pressure supplied to the ram 74 in the extending mode. By way of example a pressure of approximately 100 bar is sufficient to keep the coupling units 54, 66 in the engaged state.

In order to release the attachment, the control valve 85 is operated (conveniently from the cab of the excavator by any conventional remote control means) to affect the retracting mode in which hydraulic fluid is supplied to the circuits HC1, HC2 via port B. As a result, hydraulic fluid is supplied to the respective retract side of each ram 32, 74. The spring 33 resists movement of the hook 30 out of the locking state, which causes the ram 74 to retract before the ram 32 retracts.

Accordingly, the hydraulic coupling unit 66 is moved out of its engaging state before the hook 30 is retracted. In preferred embodiments, the arrangement is such that the coupling unit 66 is moved completely clear of the coupling unit 54 before the hook 30 begins to move.

After an initial period during which the ram 32 does not retract, the retracting force of the ram 32 overcomes the force of the spring 33 and the ram 34 retracts. Hence the hook 30 is moved out of its locking state, allowing the pin 47 to be removed from the recess 22. The attachment may then be removed from the coupler 10 in normal manner.

It will be apparent from the foregoing that the spring 33 serves as delay means for causing the latch 30 to move out of its locking state after the coupling unit 66 has disengaged from the coupling unit 54. In alternative embodiments, the coupler may include alternative delay means for controlling its operation such that, when decoupling an attachment from the coupler, the hook 30 remains in its locking state until after the hydraulic coupling unit 66 is moved out of engagement with the hydraulic coupling unit 54. For example, a hydraulic switch (not illustrated) may be incorporated into circuit HC1 that is operable to allow or prevent hydraulic fluid flowing to the retract side of the ram 32, or from the extend side of the ram 32. In alternative embodiments in which movement of the ram 32 is controlled by an electrical circuit, the switch may be an electrical switch. The switch may take any conventional form. The switch may be operated by a timer (e.g. such that the ram 32 is retracted a period of time after control valve 85 is activated to retract the ram to allow time for the coupling unit 66 to disengage first). Alternatively, the switch may be operated by a sensor (not shown), or other detecting means, that is arranged to detect when the coupling unit 66 is disengaged and is connected to the switch to operate it accordingly. The sensor may take any conventional form, e.g. a non-contact sensor such as an optical sensor, an electrical field sensor or an acoustic (e.g. ultrasonic sensor), or a contact sensor, e.g. a pressure sensor or a mechanical device that is positioned to be activated (e.g. by pressure or movement) by engagement with the coupling unit 66 itself, or with any other component that moves with the coupling unit 66, when the coupling unit 66 moves out of engagement with the coupling unit 54 (i.e. the switch may be a mechanically operated switch, such as a plunger switch, lever switch or a limit switch). Alternatively still, the delay means may comprise a mechanical linkage (not shown) coupled between the coupling unit 66 and the hook 32 and configured to hold the hook 32 in its locking state until after the coupling unit has disengaged from the coupling unit 54.

It is advantageous for the coupling unit 66 to be moved out of engagement with the coupling unit 54 before the hook 30 has disengaged with the pin 47 since this allows correct alignment between the units 54, 66 to be maintained while disengagement of the coupling units 54, 66 is effected, which reduces the possibility of the components of the units 54, 66 being damaged during disengagement.

Figure 11:
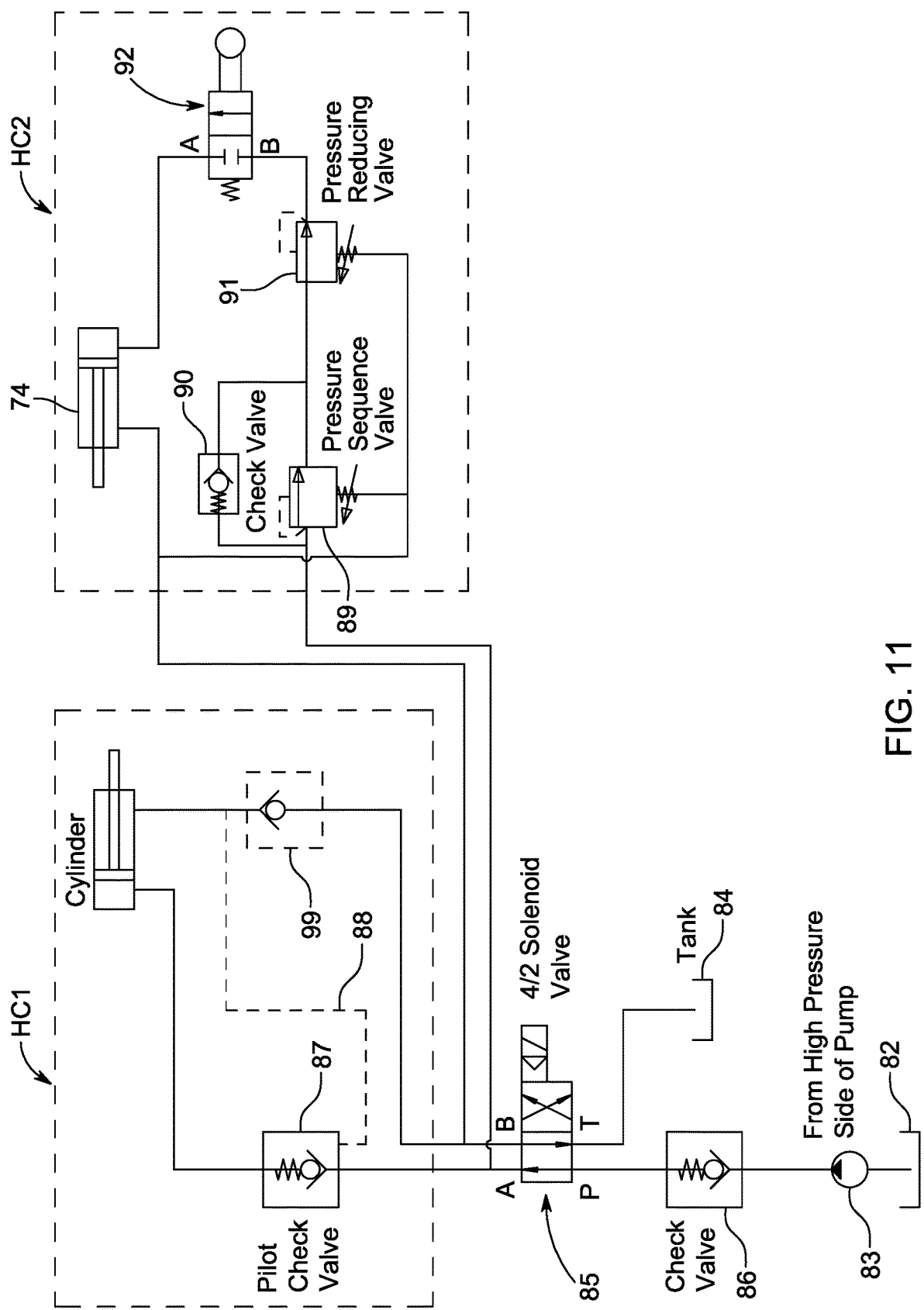
FIG. 11 is a schematic diagram of an alternative hydraulic circuit for use with the coupler of FIG. 1.

FIG. 11 shows a modification of the circuit of FIG. 10 in which a directional control valve 92 is included in the extend side of the circuit HC2 and is operable to selectably allow or prevent hydraulic fluid from being supplied to the extend side of the ram 74. During operation of the coupler 10 as described above, the valve 92 is configured to allow fluid to flow to the extend side of the ram 74.

However, in cases where the attachment does not require hydraulic power, the valve 92 is configured to prevent fluid from flowing to the extend side of the ram 74, thereby preventing the ram 74 from being extended and the coupling unit 66 from being moved towards its engagement state. The valve 92 may conveniently be a two port/two position directional control valve, wherein in the two positions ports A and B are either connected or not connected. The valve 92 may be electrically controlled, conveniently being a solenoid valve (and may therefore be operable remotely by a user in the cab of the excavator), but may alternatively be controlled by any other means (optionally such that it may be operated remotely by a user in the cab of the excavator, but alternatively manually by any convenient manual control). The valve 92 allows the movement of the coupling unit 66 to be disabled, which helps to prevent it from being damaged in cases where there is no corresponding coupling unit 54 for it to engage with.

The circuits of FIGS. 10 and 11 include an optional tilt-operated check valve 99, which does not contribute to the present invention and may be omitted.

In alternative embodiments, the actuator 74 may be an electric actuator operated by an electric circuit. Alternatively still, instead of or as well as the actuator 74, alternative actuating means may be provided for moving the coupling unit 66, for example one or more mechanical linkage coupled to the hook 32 or actuator 30.

It will be apparent from the foregoing that, in preferred embodiments, the coupler 10 allows hydraulically powered attachments to be mechanically and hydraulically connected to, and disconnected from, the excavator (or other machine) without the operator having to leave the cab, and while reducing the possibility that the hydraulic couplings will be damaged by, for example, misalignments. Moreover, this automatic mechanical and hydraulic connection/disconnection can be achieved for attachments having different spacings between the attachment pins.

Referring now in particular to FIGS. 12 to 15, an optional depressurization system is described and illustrated. The depressurization system is operable to depressurize hydraulic fluid supply lines 69A, 69B that are connected, in use, to the coupler 10, in particular for supplying hydraulic power to an attachment connected to the coupler. Such depressurization facilitates connection of the couplings 68 of the coupling unit 66 with the corresponding couplings 56 of the coupling unit 54 since this connection can be hindered or prevented if the lines 69A, 69B are pressurized. In the illustrated embodiment, the supply lines 69A, 69B are connected to the coupling unit 66 via a respective one of the hydraulic couplings 68. The hydraulic supply lines 69A, 69B typically form part of the hydraulic system of the excavator or other machine to which the coupler 10 is connected and may be of a type commonly referred to as hammer lines.

Figure 12:
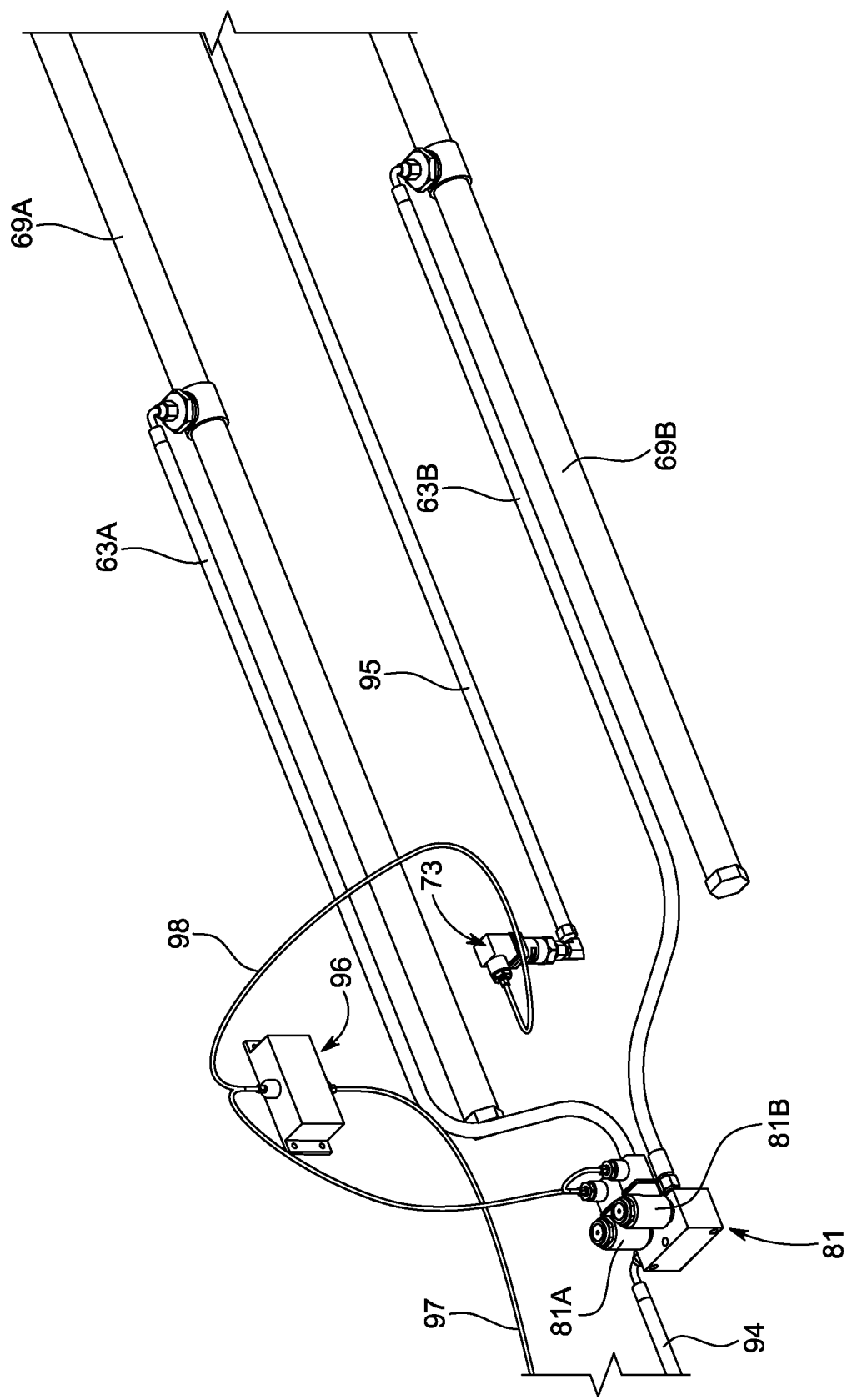
FIG. 12 is a perspective view of an optional depressurization system for use with couplers embodying the invention.
Figures 13, 14:
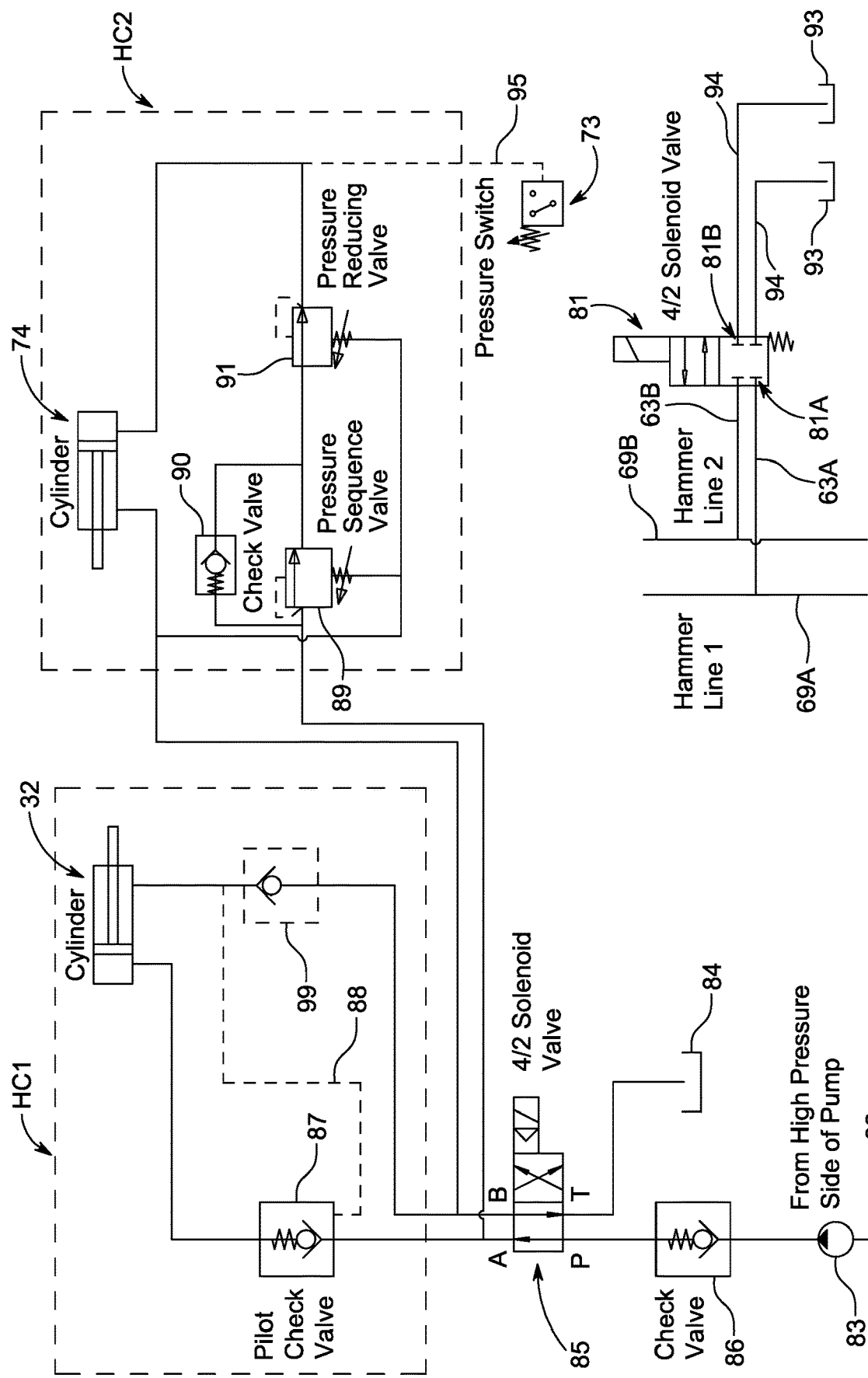
FIG. 13 is a hydraulic circuit showing part of the optional depressurization system.
FIG. 14 is a schematic diagram showing the hydraulic circuit of FIG. 10 with an optional pressure switch being part of the preferred depressurization system.

FIG. 12 shows the supply lines 69A, 69B connected, in this example by hydraulic fluid lines 63A, 63B, to a depressurization valve device 81 that comprises a respective valve 81A, 81B for each supply line 69A, 69B. The valve device 81 is connected to a hydraulic fluid reservoir, or tank, (not shown in FIG. 12 but shown as 93 in FIG. 13) by one or more hydraulic fluid line 94, as is convenient. FIG. 13 shows a hydraulic circuit comprising the supply lines 69A, 69B, valve device 81, dump reservoir 93 and interconnecting fluid lines 63A, 63B, 94. In FIG. 13 a respective fluid line 94 and respective reservoir 93 are shown for each valve 81A, 81B, although a common fluid line 94 and reservoir 93 may alternatively be provided.

FIG. 12 also shows a hydraulic pressure sensitive device, or switch, 73 that is connected hydraulically to the coupler 10, conveniently to the coupling unit 66, by hydraulic line 95. In the illustrated embodiment, the pressure switch 73 is connected to the extend side of actuator 74, but could alternatively be connected to any other convenient location of the coupler's hydraulic circuit, preferably directly or indirectly to any part of the hydraulic supply to the coupler 10 when the actuators 32, 74 are being extended. FIG. 14 shows the hydraulic circuit of FIG. 10 with the hydraulic pressure switch 73 connected to the hydraulic line that is connected to the extend side of hydraulic actuator 74.

The depressurization system includes a control device 96 which in preferred embodiments is an electrical switch device. The control device 96 controls the operation of the depressurization valve device 81 in response to one or more inputs indicating the state of the coupler 10. The control device 96 receives a first input, typically comprising an electrical signal, indicating whether to coupler 10 has been activated to adopt its locking state or its non-locking state. The first input is preferably obtained from the coupler 10, conveniently from the electrical part of the solenoid valve 85, preferably by a wired connection 97. In alternative embodiments, the first input may be provided wirelessly and/or may be sent from the excavator cab. Preferably, the first input is an electrical power input that is capable of energising, and therefore operating, the valve device 81.

In preferred embodiments, the control device 96 receives a second input, typically comprising an electrical signal, from the pressure switch 73, conveniently by wired connection 98 but alternatively by a wireless connection. The second input signal indicates when the pressure switch 73 detects that the fluid pressure in the relevant part of the coupler hydraulic circuit reaches a threshold value that is indicative of the coupler 10 being in its locked state. The threshold value may match the maximum fluid pressure in the relevant part of the hydraulic circuit when the coupler is locked, but preferable is set to a value that is less than the maximum fluid pressure but nevertheless indicative of the coupler being in the locked state, i.e. locked or close to being locked. It is noted that in the illustrated embodiment where the pressure switch 73 is incorporated into the hydraulic circuit that controls the actuator 74, the pressure switch 73 is directly detecting fluid pressure relating to the actuator 74 that controls movement of the coupling unit 66 rather than the hook 32. Nevertheless, such detection is indicative of the locking/non-locking state of the coupler 10.

The control device 96 provides an output signal to the valve device 81 for controlling the operation of the valve device 81, in particular to open and close the valves 81A, 81B as required. The valve device 81 is typically electrically operated and so the output signal from the control device 96 is typically an electrical signal. In preferred embodiments, the output signal is sent to the valve device 81 by a wired connection, but may be sent wirelessly in alternative embodiments. The valve device 81 is conveniently a solenoid valve device, and in the embodiment shown in FIG. 15 comprises a respective solenoid valve 81A, 81B for each of the hydraulic fluid lines 69A, 69B.

The valve device 81 is operable between a closed state, in which the fluid supply lines 69A, 69B are not connected to the dump reservoir 93 and so fluid pressure is able to build up and/or be maintained in the fluid supply lines 69A, 69B, and an open state in which fluid in the supply lines 69A, 69B is dumped to the dump reservoir 93 via the valve device 81 thereby depressurizing the supply lines 69A, 69B. When the coupler 10 is in the locking state, the valve device 81 is closed and the fluid supply lines 69A, 69B are pressurised. When the operator activates the coupler 10 to adopt the non-locking state, the corresponding first input signal is sent to the control device 96 (conveniently from solenoid valve 85) to indicate that the coupler 10 is unlocking. In response to the first input signal, the control device 96 causes the valve device 81 to open thereby causing the hydraulic lines 69A, 69B to depressurise.

When the operator activates the coupler to adopt the locking state, the control device 96 causes the valve device 81 to close thereby allowing the supply lines 69A, 69B to pressurise. In preferred embodiments, the control device 96 causes the valve device 81 to close in response to receiving the second input signal indicating that the coupler 10 is in, or substantially in, its locking state. This arrangement prevents accidental pressurization of the lines 69A, 69B. Alternatively, the state of the first input may be used to open and close the valve device 81, in which case the second input and pressure switch 73 are not required.

Figure 5:
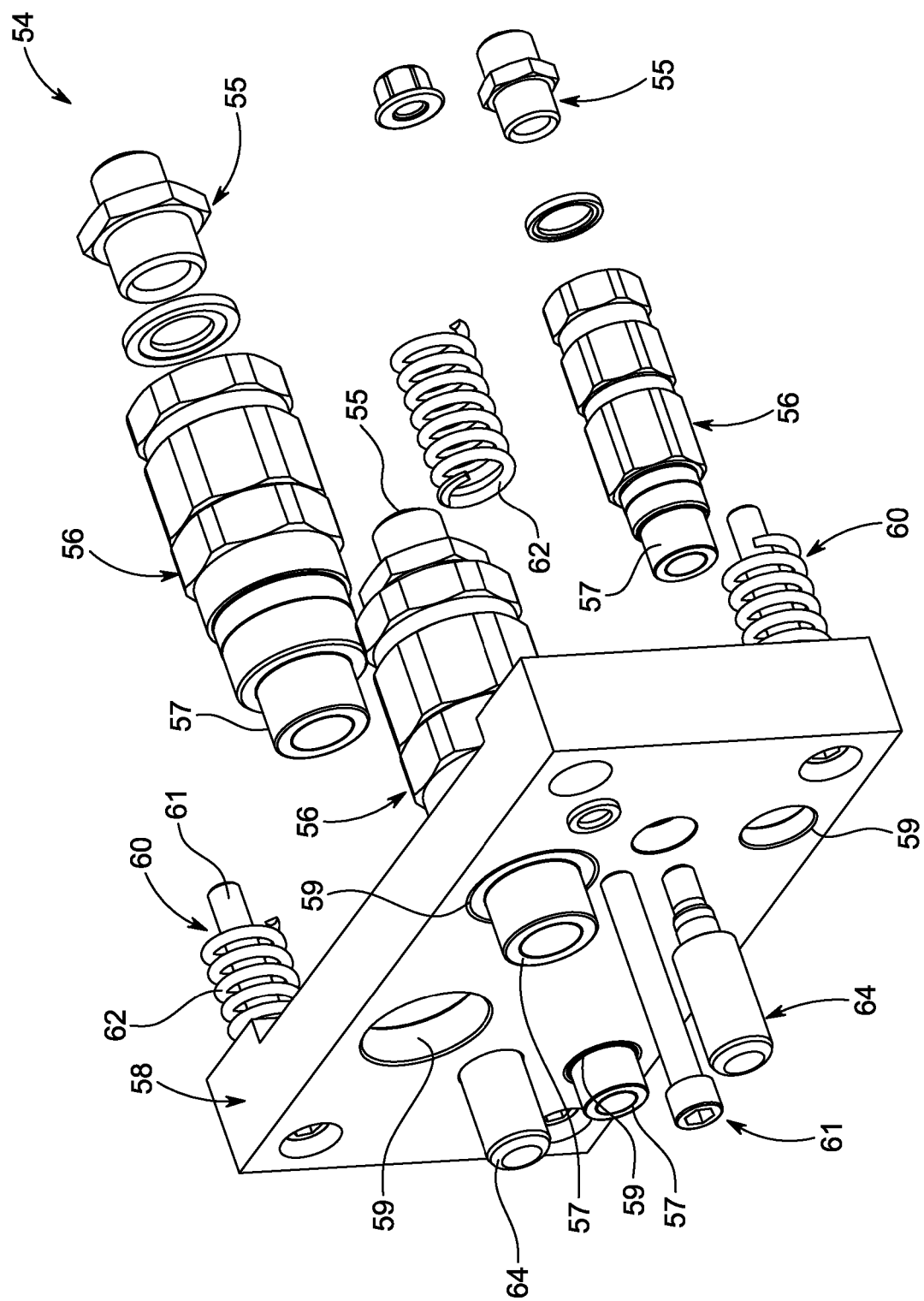
FIG. 5 is an exploded perspective view of a hydraulic coupling unit included in the coupling part of FIG. 4.
Figure 6:
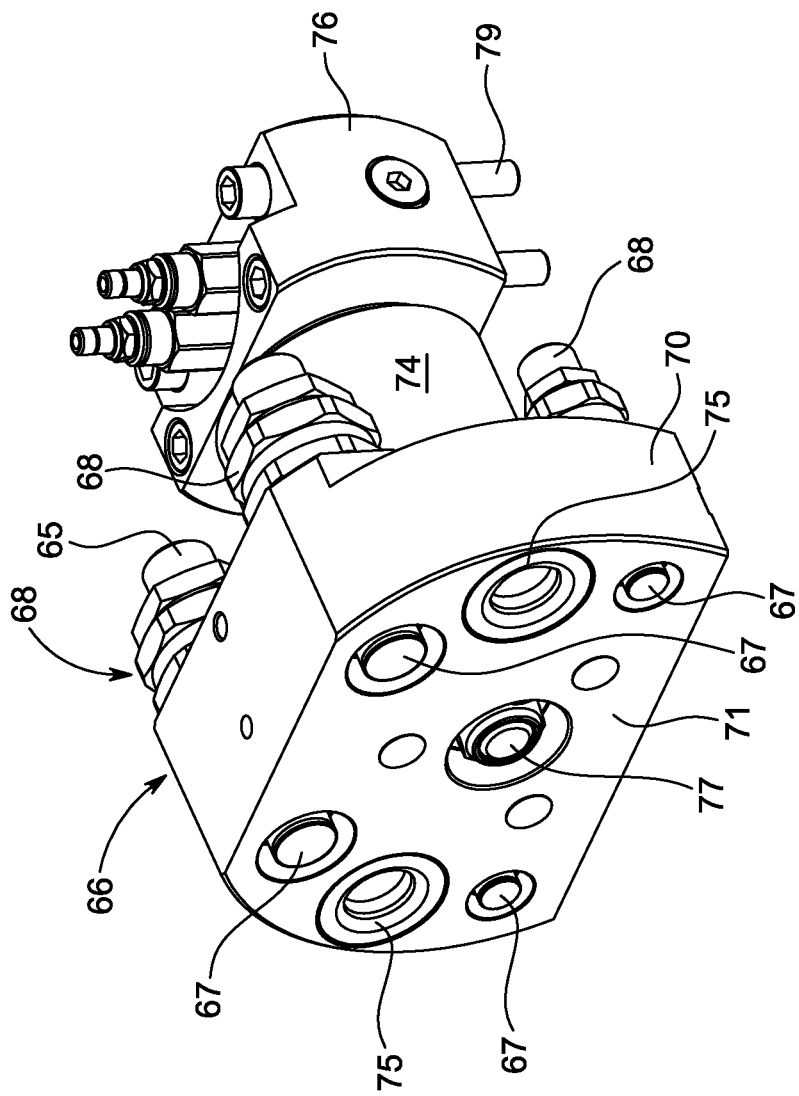
FIG. 6 is a perspective view of a hydraulic coupling assembly being part of the coupler of FIG. 1.
Figure 7:
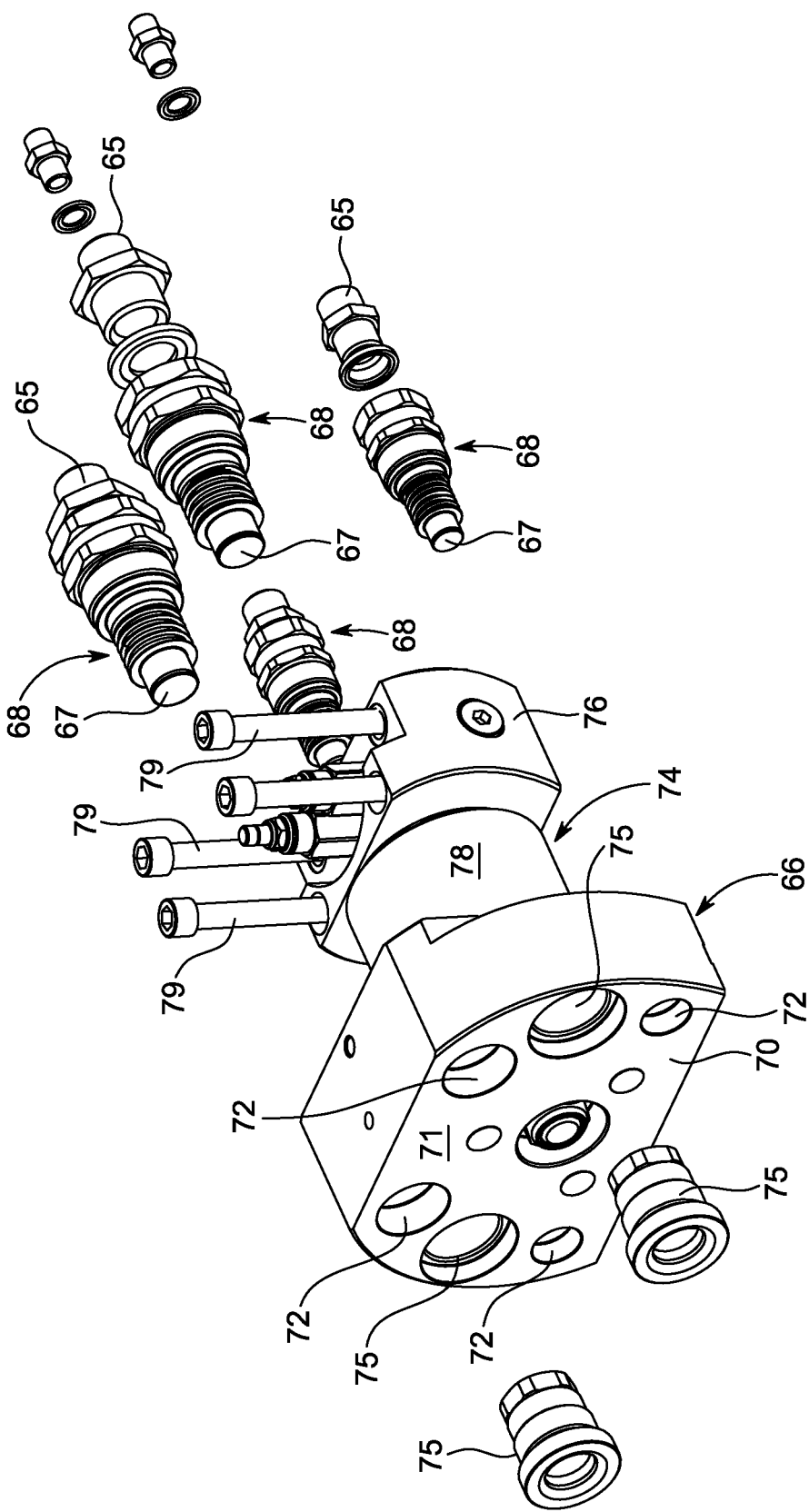
FIG. 7 is an exploded perspective view of the hydraulic coupling assembly of FIG. 6.
Figure 9:
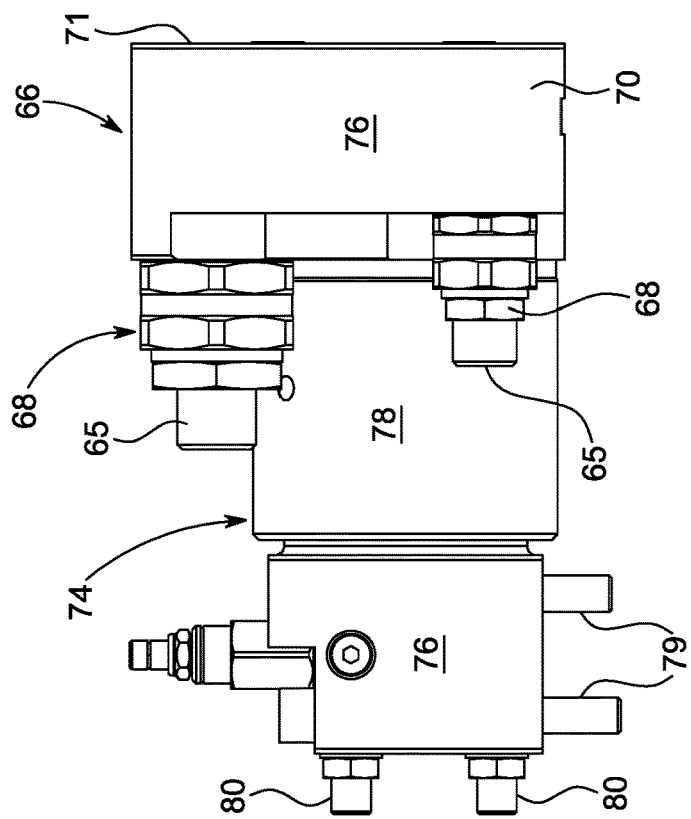
FIG. 9 is a side view of the hydraulic coupling assembly of FIG. 6.
Figure 8:
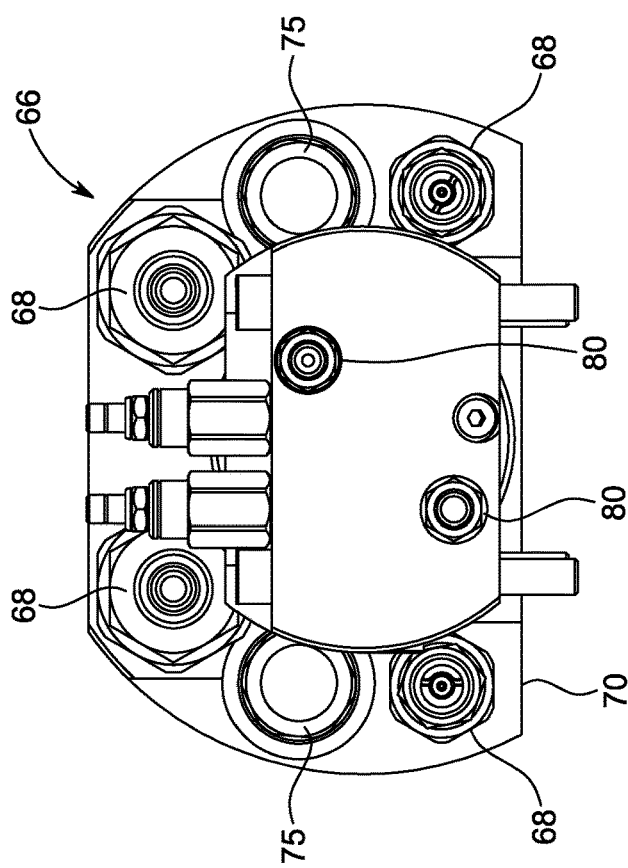
FIG. 8 is an end view of the hydraulic coupling assembly of FIG. 6.
Figure 15:
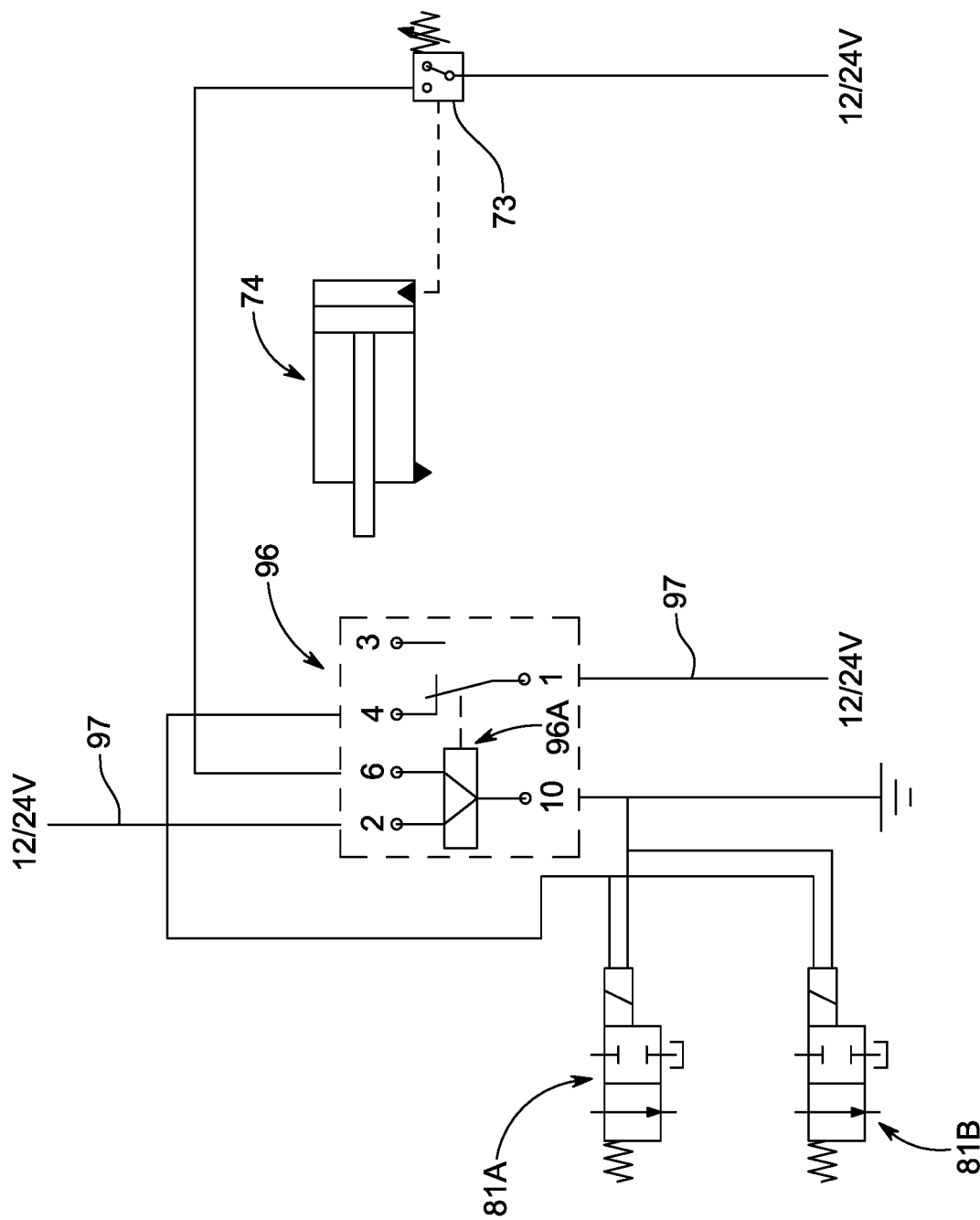
FIG. 15 is a schematic diagram of a preferred electrical control system being part of the optional depressurization system.

In preferred embodiments, the control device 96 receives an electrical power input (at pin 1 in the example of FIG. 15) and comprises a latch device 96A that is operable to send the received electrical power to the valve device 81 (via pin 4 in the example of FIG. 5) or not. Conveniently the electrical power input is the first input described above. The first input may also be used to operate the latch device 96A to cause it to supply the received electrical power to the valve device 81. In the example of FIG. 15, the first input is also received at pin 2 as a first control signal for causing the latch device 96A to connect pin 1 to pin 4 thereby supplying the power to the valve device 81 to cause it to open. Therefore, when the control device 96 receives the first input as described above, the latch device 96A is operated to energise, and therefore open, the valve device 81. The latch device 96A is configured to receive a second control signal (at pin 6 in the example of FIG. 15) for causing the latch device 96A not to send the received power to the valve device 81 (i.e. by connecting its switching element to pin 3 rather than pin 4 in the example of FIG. 15). The second input received from the pressure switch 73 as described above serves as the second control signal for the latching device 96A. Accordingly, when the operator operates the coupler 10 to adopt its non-locking state, the first input received by the control device 96 causes the latching device 96A to energise, and therefore open, the valve device 81. When the operator subsequently operates the coupler 10 to adopt the locking state, even though the first input at pin 2 is lost, the latching device 96A maintains the power supply to the valve device 81 (via pins 1 and 4 in FIG. 15) until the pressure switch 73 sends its signal indicating that the coupler 10 is in, or substantially in, the locking state.

Figure 16:
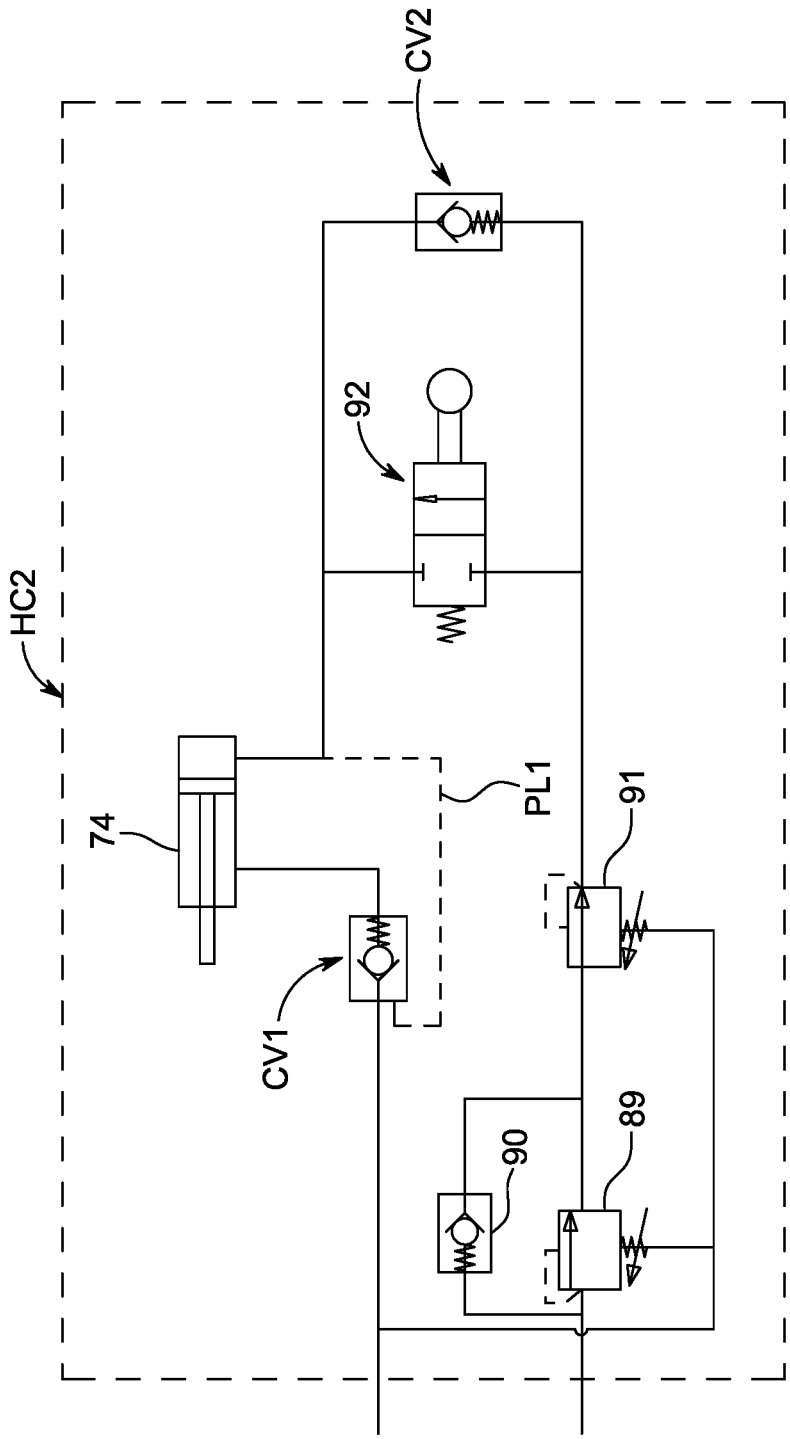
FIG. 16 is a schematic diagram showing part of the hydraulic circuit of FIG. 11 with optional check valves.

Referring now to FIG. 16, there is shown a modified hydraulic circuit HC2' for operating the actuator 74. The circuit HC2' is the same as the circuit HC2 of FIG. 11 except that optional check valves CV1 and CV2 are provided. CV1 is a pilot operated check valve that is connected between port B and the retract side of the ram 74 in order to selectively preventing hydraulic fluid flowing out of the retract side of ram 74. The pilot control line PL1 of the valve CV1 is connected to the extend side of ram 74 so that, in the extending mode of the ram 74, PL1 is pressurised and configures CV1 to allow fluid to flow from the retract side of ram 74. However, when the ram 74 is not in its extend mode, PL1 is not pressurised and so CV1 prevents fluid flowing out of the retract side of ram 74. Hence the pilot check valve CV1 acts to prevent unwanted extension (sometimes referred to as drift) of the ram 74. Alternatively, or in addition, check valve CV2 is provided and is connected to the extend side of the ram 74, conveniently across (i.e. in parallel with) the valve 92, being configured to allow hydraulic fluid to flow out of the extend side (by passing valve 92 in the illustrated example). CV2 allows the ram 74 to be retracted, or pushed back, in the event that any unwanted extension occurs. Check valve CV2 may provided integrally with valve 92.

The invention is not limited to the embodiment(s) described herein but can be amended or modified without departing from the scope of the present invention.

The invention claimed is:

1. A coupler for coupling an attachment to an excavator or other machine, the coupler comprising:
    a body having a first and second spaced-apart coupling formations for coupling with a respective corresponding coupling formation of said attachment;
    a locking member movable into and out of a locking state in which it is capable of retaining the respective attachment coupling formation in engagement with said first coupling formation;
    a first powered actuator for actuating said locking member into and out of said locking state;
    a first power coupling unit;
    actuating means for moving said power coupling unit with respect to said body into and out of an engaging position in which it is engageable with a corresponding second power coupling unit of said attachment when said attachment is coupled to said excavator or other machine,
    wherein said coupler further includes delay means configured to, when decoupling an attachment from the coupler, cause said locking member to remain in its locking state until after the first power coupling unit is moved out of its engaging position.

2. The coupler of claim 1, further including activation means configured to cause said actuating means to move said first power coupling unit into said engaging position after said locking member adopts the locking state.

3. The coupler of claim 2, wherein said activation means is responsive to said locking member adopting the locking state to cause said actuating means to move said first power coupling unit into said engaging position.

4. The coupler of claim 3, wherein said actuating means comprises a second powered actuator, and said activation means comprises a component of a circuit for operating said second powered actuator, said component being responsive to said locking member adopting the locking state to cause said second actuator to move said first power coupling unit into said engaging position.

5. The coupler of claim 4, wherein said second actuator is a hydraulic actuator and said circuit is a hydraulic circuit, wherein said circuit component comprises a hydraulic sequence valve that is responsive to hydraulic pressure in said hydraulic circuit above a threshold level to cause said second actuator to move said first power coupling unit into said engaging position, and wherein, preferably, said threshold level corresponds to a hydraulic pressure when said locking member is in the locking state.

6. The coupler of claim 4, wherein said circuit component comprises a switch that is operable by means for determining that said locking member adopts the locking state to cause said second actuator to move said first power coupling unit into said engaging position, and wherein the switch operating means preferably comprises a sensor for detecting when said locking member is in the locking state, and wherein, optionally, the switch operating means comprises a mechanical device arranged for engagement with said locking member, or a component coupled thereto, when said locking member is in the locking state.

7. The coupler of claim 1, wherein said actuating means comprises a hydraulic actuator connected to a hydraulic operating circuit, and wherein said hydraulic operating circuit includes means, preferably a pressure reducing valve, for reducing hydraulic pressure in said hydraulic operating circuit, and wherein, optionally, said second actuator is a hydraulic actuator and said circuit is a hydraulic circuit, wherein said circuit component comprises a hydraulic sequence valve that is responsive to hydraulic pressure in said hydraulic circuit above a threshold level to cause said second actuator to move said first power coupling unit into said engaging position, and wherein, preferably, said threshold level corresponds to a hydraulic pressure when said locking member is in the locking state, and wherein said hydraulic operating circuit comprises a pressure reducing valve connected in series after said sequence valve.

8. The coupler of claim 2, wherein activation means comprises a timer, and wherein, preferably, said actuating means comprises a second powered actuator, and said activation means comprises a component of a circuit for operating said second powered actuator, said component being responsive to said timer to cause said second actuator to move said first power coupling unit into said engaging position after said locking member adopts the locking state.

9. The coupler of claim 1, wherein said delay means comprises at least one spring coupled to said locking means and being biased to urge said locking member into the locking state.

10. The coupler of claim 1, wherein said delay means comprises a component of a circuit for operating said first powered actuator, said component being responsive to said first power coupling unit moving out of said engaging position to cause said first actuator to move said locking member out of said locking state, and wherein, optionally, said circuit component comprises a switch that is operable by means for determining that said first power coupling unit is out of said engaging position to cause said first actuator to move said locking member out of said locking state, and wherein the switch operating means may comprise a sensor for detecting when said first power coupling unit is out of said engaging position, and wherein, optionally, the switch operating means comprises a mechanical device arranged for engagement with said first power coupling unit, or a component coupled thereto, when said first power coupling unit moves out of said engaging position.

11. The coupler of claim 1, wherein said delay means comprises a timer, and wherein, preferably, said delay means comprises a component of a circuit for operating said first powered actuator, said component being responsive to said timer to cause said first actuator to move said locking member out of said locking state.

12. The coupler of claim 2, wherein said activation means comprises a mechanical linkage coupled between said locking member and said first power coupling unit.

13. The coupler of claim 1, wherein said delay means comprises a mechanical linkage coupled between said locking member and said first power coupling unit.

14. The coupler of claim 1, wherein said first power actuator is a hydraulic actuator.

15. The coupler of claim 1, wherein said actuating means comprises a hydraulic actuator.

16. The coupler of claim 1, wherein said first power coupling unit comprises at least one power coupling, typically at least one hydraulic coupling and/or at least one electrical coupling.

17. The coupler of claim 1, including control means operable to cause said coupler to couple with said attachment by actuating said locking member into said locking state and moving said first power coupling unit into said engaging position, or to decouple from said attachment by moving said first power coupling unit out of said engaging position and actuating said locking member out of said locking state, and wherein said control means preferably comprises one or more user operable control that is preferably operable from a cab of the excavator or other machine.

18. The coupler of claim 1, wherein said actuating means comprises a hydraulic actuator connected to a hydraulic operating circuit, and wherein said hydraulic operating circuit includes a pilot operated valve connected to the retract side of said hydraulic actuator and configurable to prevent hydraulic fluid flowing from said retract side, a pilot control line coupled between the pilot operated valve and the extend side of said actuator, wherein, in an extend mode of the hydraulic actuator, the pilot control line configures said pilot operated valve to allow fluid to flow from said retract side, the pilot operated valve otherwise being configured to prevent hydraulic fluid flowing from said retract side.

19. The coupler of claim 1 wherein said actuating means comprises a hydraulic actuator connected to a hydraulic operating circuit, and wherein said hydraulic operating circuit includes a check valve connected to the extend side of the actuator and being configured to prevent hydraulic fluid flowing out of said extend side.

20. A coupling system comprising the coupler of claim 1 and a coupling part for said attachment, said coupling part including said second power coupling unit, comprising at least one power coupling, typically at least one hydraulic coupling and/or at least one electrical coupling.

21. The coupling system of claim 20, wherein the second coupling unit is mounted on the coupling part by one or more spring-biased connector that allows relative spring-biased movement between the second coupling unit and the coupling part, and wherein, preferably, in a rest state the or each connector holds the second coupling unit spaced apart from the coupling part and allows movement of the second coupling unit towards the coupling part against the spring-bias.

22. A coupling system comprising the coupler of claim 1 and a depressurization system, wherein said first power coupling unit comprises at least one hydraulic coupling for connection to at least one hydraulic line of a hydraulic system of said excavator or other machine, and wherein said depressurization system comprises:
    a depressurization valve device for selectively connecting said at least one hydraulic line to a hydraulic fluid reservoir in order to dump hydraulic fluid from said at least one hydraulic line to said reservoir; and
    a control device for operating said depressurization valve device, said control device being configured to detect operation of said coupler out of said locking state or into said locking state,
    wherein said control device is configured to, in response to detecting operation of the coupler out of the locking state, operate said depressurization valve device to connect said at least one hydraulic line to said hydraulic fluid reservoir in order to dump hydraulic fluid from said at least one hydraulic line to said reservoir, and in response to detecting operation of the coupler into said locking state, to operate said depressurization valve device to prevent hydraulic fluid being dumped from said at least one hydraulic line to said reservoir.

23. The coupling system of claim 22, wherein said control device is configured to receive a first input indicating operation of said coupler out of said locking state, and to operate said depressurization valve device to connect said at least one hydraulic line to said hydraulic fluid reservoir in response to said first input, and wherein, preferably, said first input is received from said coupler, preferably from a control valve for controlling operation of said coupler into and out of said locking state.

24. The coupling system of claim 22, wherein said control device is configured to receive a second input that is indicative of operation of said coupler into said locking state, and to operate said depressurization valve device to disconnect said at least one hydraulic line from said hydraulic fluid reservoir in response to said second input, and wherein, preferably, the coupling system further includes a pressure sensitive device incorporated into a hydraulic circuit of said coupler and being configured to indicate when the hydraulic pressure in said hydraulic circuit is indicative of the coupler adopting said locked state, and wherein said second input is provided by said pressure sensitive device.

25. A coupler for coupling an attachment to an excavator or other machine, the coupler comprising:
    a body having a first and second spaced-apart coupling formations for coupling with a respective corresponding coupling formation of said attachment;
    a locking member pivotable into and out of a locking state in which it is capable of retaining the respective attachment coupling formation in engagement with said first coupling formation;
    a first powered actuator for actuating said locking member into and out of said locking state;
    a first power coupling unit;
    actuating means for pivoting said power coupling unit with respect to said body into and out of an engaging position in which it is engageable with a corresponding second power coupling unit of said attachment when said attachment is coupled to said excavator or other machine,
    wherein said coupler further includes delay means configured to, when decoupling an attachment from the coupler, cause said locking member to remain in its locking state until after the first power coupling unit is moved out of its engaging position.

* * * * *